(12) United States Patent
Sudbrink et al.

(10) Patent No.: US 10,028,423 B2
(45) Date of Patent: Jul. 24, 2018

(54) TILLAGE ELECTRO-HYDRAULIC DESIGN AND LAYOUT ON FOLD SEQUENCE OF FOLD MACHINE

(71) Applicant: CNH Industrial America LLC, New Holland, PA (US)

(72) Inventors: Matthew R. Sudbrink, Metamora, IL (US); Kena Shah, Woodridge, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 153 days.

(21) Appl. No.: 15/087,057

(22) Filed: Mar. 31, 2016

(65) Prior Publication Data

US 2016/0212927 A1 Jul. 28, 2016

Related U.S. Application Data

(63) Continuation-in-part of application No. 14/528,345, filed on Oct. 30, 2014, now Pat. No. 9,516,798, and
(Continued)

(51) Int. Cl.
*A01B 73/04* (2006.01)
*A01B 63/32* (2006.01)
*A01B 73/06* (2006.01)

(52) U.S. Cl.
CPC ............ *A01B 63/32* (2013.01); *A01B 73/048* (2013.01); *A01B 73/065* (2013.01)

(58) Field of Classification Search
CPC ......... A01B 73/00; A01B 73/02; A01B 73/04; A01B 73/044; A01B 73/046; A01B 73/06; A01B 73/048
See application file for complete search history.

(56) References Cited

U.S. PATENT DOCUMENTS 2,713,296 A 7/1955 Silver et al.
2,755,722 A 7/1956 Fraga
(Continued)

FOREIGN PATENT DOCUMENTS

GB 1 269 041 3/1972
GB 1 500 179 2/1978

OTHER PUBLICATIONS

Eastman Industries Limited, Levelling, Stabilizer Arms, Draw Bar, Eye End, Turn Buckle, taken from http://www.eastmanfarmparts.com/levelling-stabilizer-arms-draw-bar1.html, May 6, 2013 (1 page).

*Primary Examiner* — Matthew D. Troutman
(74) *Attorney, Agent, or Firm* — Rebecca L. Henkel; Rickard K. DeMille

(57) ABSTRACT

An agricultural tillage implement has a main frame section with a telescoping pull hitch tube and a tool bar. A left wing section and a right wing section are pivotally coupled with the main frame section. At least one wing implement is pivotally coupled with each wing section. A hydraulic system has a left wing hydraulic subsystem for actuating the left wing implements and a right wing hydraulic subsystem for actuating the right wing implements. The hydraulic system has at least one hydraulic flow divider and combiner between the left hydraulic circuit and the right hydraulic circuit that functions to coordinate the motion of the left wing implements and the right wing implements.

12 Claims, 10 Drawing Sheets

Related U.S. Application Data a continuation-in-part of application No. 14/528,236, filed on Oct. 30, 2014, now Pat. No. 9,706,699, application No. 15/087,057, filed on Mar. 31, 2016, which is a continuation-in-part of application No. 14/528,356, filed on Oct. 30, 2014, now Pat. No. 9,554,497, application No. 15/087,057, filed on Mar. 31, 2016, which is a continuation-in-part of application No. 14/528,535, filed on Oct. 30, 2014, now Pat. No. 9,596,799.

(60) Provisional application No. 61/914,502, filed on Dec. 11, 2013, provisional application No. 61/914,594, filed on Dec. 11, 2013.

(56) References Cited

U.S. PATENT DOCUMENTS

| | | | |
|---|---|---|---|
| 2,828,680 A | 4/1958 | Johnson | |
| 3,333,645 A | 8/1967 | Gustafson | |
| 3,588,139 A | 6/1971 | Bayne | |
| 3,880,241 A | 4/1975 | Vincent | |
| 4,126,187 A | 11/1978 | Schreiner | |
| 4,211,287 A * | 7/1980 | Garrison | A01B 73/067 172/311 |
| 4,265,464 A | 5/1981 | Lange | |
| 4,320,805 A | 3/1982 | Winter | |
| 4,418,762 A | 12/1983 | Page | |
| 4,492,272 A | 1/1985 | Jensen | |
| 4,564,073 A | 1/1986 | Ide et al. | |
| 4,700,784 A | 10/1987 | Wiebe et al. | |
| 4,703,810 A | 11/1987 | Meiners | |
| 4,778,194 A | 10/1988 | Koch et al. | |
| 5,251,704 A | 10/1993 | Bourgault | |
| 5,462,123 A | 10/1995 | Harlan et al. | |
| 5,488,996 A | 2/1996 | Barry et al. | |
| 5,524,712 A | 6/1996 | Balmer | |
| 5,641,026 A | 6/1997 | Balmer | |
| 5,839,516 A | 11/1998 | Arnold et al. | |
| 6,131,669 A * | 10/2000 | Friggstad | A01B 63/32 172/311 |
| 6,141,612 A | 10/2000 | Flamme | |
| 6,192,994 B1 * | 2/2001 | Friggstad | A01B 63/32 172/311 |
| 6,202,756 B1 * | 3/2001 | Hundeby | A01B 63/32 172/311 |
| 6,205,937 B1 * | 3/2001 | Shoup | A01B 73/00 111/54 |
| 6,263,977 B1 | 7/2001 | Mayerie et al. | |
| 6,269,887 B1 | 8/2001 | Friggstad | |
| 6,293,352 B1 * | 9/2001 | Hundeby | A01B 63/32 111/54 |
| 6,336,511 B1 * | 1/2002 | Friggstad | A01B 73/02 172/311 |
| 6,374,923 B1 | 4/2002 | Friggstad | |
| 6,415,873 B1 | 7/2002 | Hudgins | |
| 6,443,474 B1 | 9/2002 | Kay | |
| 6,550,543 B1 | 4/2003 | Friggstad | |
| 6,557,646 B1 | 5/2003 | Hurtis et al. | |
| 6,609,575 B1 | 8/2003 | Crabb | |
| 6,612,381 B2 | 9/2003 | Powell et al. | |
| 6,681,868 B2 | 1/2004 | Kovach et al. | |
| 6,708,775 B2 | 3/2004 | Beaujot | |
| 7,048,071 B1 | 5/2006 | Huenink et al. | |
| 7,581,597 B2 | 9/2009 | Neudorf | |
| 7,604,068 B1 | 10/2009 | Friesen | |
| 7,926,247 B2 | 4/2011 | Van Den Engel | |
| 8,020,629 B1 | 9/2011 | McFarlane et al. | |
| 8,047,299 B2 | 11/2011 | Hurtis et al. | |
| 8,118,110 B2 | 2/2012 | Tamm et al. | |
| 8,141,653 B2 | 3/2012 | Ryder | |
| 8,176,992 B2 | 5/2012 | Yuen | |
| 8,235,133 B2 | 8/2012 | Friggstad | |
| 8,235,410 B2 | 8/2012 | Weber et al. | |
| 8,336,639 B2 | 12/2012 | Palen | |
| 8,342,256 B2 | 1/2013 | Adams et al. | |
| 8,408,326 B2 | 4/2013 | Yuen et al. | |
| 8,567,517 B2 | 10/2013 | Friggstad et al. | |
| 8,794,344 B2 | 8/2014 | Blunier | |
| 2003/0150626 A1 | 8/2003 | Domries | |
| 2005/0087350 A1 | 4/2005 | Bauer | |
| 2007/0240889 A1 | 10/2007 | Neudorf | |
| 2010/0025056 A1 | 2/2010 | Friggstad | |
| 2011/0284252 A1 | 11/2011 | Friggstad | |
| 2011/0290513 A1 | 12/2011 | Yuen | |
| 2011/0315411 A1 | 12/2011 | Adams | |
| 2013/0068489 A1 | 3/2013 | Blunier et al. | |
| 2014/0034342 A1 | 2/2014 | Friggstad | |
| 2014/0069670 A1 | 3/2014 | Friesen | |
| 2015/0150185 A1 * | 6/2015 | Houck | A01B 59/042 172/388 |

* cited by examiner

TILLAGE ELECTRO-HYDRAULIC DESIGN AND LAYOUT ON FOLD SEQUENCE OF FOLD MACHINE

CROSS REFERENCE TO RELATED APPLICATIONS

This is a continuation-in-part application based upon U.S. Non-Provisional patent application Ser. No. 14/528,345, entitled "FOLDING SEQUENCE OF ENTIRE AGRICULTURAL TILLAGE IMPLEMENT", filed Oct. 30, 2014, which is a non-provisional of U.S. Provisional Application Ser. No. 61/914,502, entitled "TILLAGE IMPLEMENT WITH FOLDABLE SHANK FRAME", filed Dec. 11, 2013 which is incorporated herein by reference; U.S. Non-Provisional patent application Ser. No. 14/528,356, entitled "FRONT FOLDING ARRANGEMENT FOR AGRICULTURAL TILLAGE IMPLEMENT", filed Oct. 30, 2014, which is a non-provisional of U.S. Provisional Application Ser. No. 61/914,502, entitled "TILLAGE IMPLEMENT WITH FOLDABLE SHANK FRAME", filed Dec. 11, 2013 which is incorporated herein by reference; U.S. Non-Provisional patent application Ser. No. 14/528,236, entitled "DRAFT LINKAGE CONFIGURATION", filed on Oct. 30, 2014, which is a non-provisional of U.S. Provisional Application Ser. No. 61/914,594, entitled "TURNBUCKLE ADJUSTMENT FOR TILLAGE IMPLEMENT TRACKING", filed on Dec. 11, 2013 which is incorporated herein by reference; and U.S. Non-Provisional patent application Ser. No. 14/528,535, entitled "DRAFT TUBE SEQUENCING FOR AN AGRICULTURAL TILLAGE IMPLEMENT", filed on Oct. 30, 2014, which is a non-provisional of U.S. Provisional Application Ser. No. 61/914,594, entitled "TURNBUCKLE ADJUSTMENT FOR TILLAGE IMPLEMENT TRACKING", filed Dec. 11, 2013 which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of agricultural tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, drag tines, etc., or any combination thereof.

As agricultural tillage implements become wider and wider over time, it becomes more difficult to keep the transport size of the implement within manageable limits. It also becomes more difficult to convert the agricultural tillage implement from an operating configuration to a transport configuration, or vice versa, without requiring too much time and difficulty on the part of the operator. It is desirable for the agricultural tillage implement to be converted from one mode to the other while the operator remains within the operator cab, through the use of hydraulics or other actuators. It is also desirable for the agricultural tillage implement to remain within certain geometric constraints so that it is not necessary to use a separate "escort vehicle" or the like when traveling on public roads.

It is further desirable that any hydraulic system used to convert the agricultural tillage implement from one mode to the other be as efficient, robust, as simple as possible, and operate in a coordinated fashion without excessive intervention by an operator. Yet, the hydraulic system should accomplish this using readily available components.

SUMMARY OF THE INVENTION

The present invention provides an agricultural tillage implement with wing sections that are foldable to a compact transport configuration. The present invention may include a main shank frame that is foldable up and over a tool bar when in the transport configuration, and that is foldable down and forward of the tool bar when in the operating configuration. The present invention may further include wing front shank frames that fold upwards over the tool bar sections of each wing section when in the transport configuration, and that fold down and forward of the tool bar when in the operating configuration. The present invention may further include wing section rear auxiliary implements that fold upward over the tool bar sections of each wing section when in the transport configuration, and that fold down and rearward of the tool bar when in the operating configuration.

The present invention may further include a hitch lock that unlocks when transitioning from the operating configuration to the transport configuration, and vice versa. The present invention may further include lift wheels and a pull hitch that raise the pull hitch tube and the tool bars when in the transport configuration, and that lower the pull hitch tube and the tool bars when in the operating configuration. The present invention may further include draft linkage assemblies with pivoting swing arms that pivot inwards when in the transport configuration, and that pivot outwards when in the operating configuration. The present invention may further include wing sections that fold forward when in the transport configuration, and that fold outward when in the operating configuration.

The present invention provides embodiments of a hydraulic system that are operable to fold and unfold the wing front shank frames and the wing section rear auxiliary implements in a coordinated fashion when transitioning to the transport configuration and to the operating configuration, respectively. The present invention further provides embodiments of the hydraulic system that are operable to fold and unfold the main shank frame in a coordinated fashion with the wing front shank frames and the wing section rear auxiliary implements when transitioning to the transport configuration and to the operating configuration, respectively. The present invention further provides embodiments of the hydraulic system that are operable to unlock the hitch lock when transitioning from the operating configuration to the transport configuration, and vice versa.

The present invention further provides embodiments of the hydraulic system that are operable to raise the pull hitch tube and the tool bars when transitioning to the transport configuration, and that lower the pull hitch tube and the tool bars when transitioning to the operating configuration, in a coordinated fashion with the folding and unfolding of the wing front shank frames and the wing section rear auxiliary implements, and with the folding and unfolding of the main shank frame. The present invention further provides embodiments of the hydraulic system that are operable to retract the gauge wheels when transitioning to the transport configuration, and to extend the gauge wheels when transitioning to the operating configuration, in a coordinated fashion with the folding and unfolding of the wing front shank frames and the wing section rear auxiliary implements, and with the folding and unfolding of the main shank frame. The present invention further provides embodiments of the hydraulic system that are operable to pivot the pivoting swing arms inwards when transitioning to the transport configuration, to pivot the pivoting swing arms outwards when transitioning to the operating configuration, to fold the wing sections forward when transitioning to the transport configuration, and to fold the wing sections outward when transitioning to the operating configuration, in coordinated fashion, and in coordination with the folding and unfolding of the wing front shank frames, the wing section rear auxiliary implements, and the main shank frame, and in coordination with the locking and unlocking of the hitch lock.

The invention in one form is directed to an agricultural tillage implement having a main frame section including a telescoping pull hitch tube extending in a travel direction, and a tool bar attached to and extending transverse to the telescoping pull hitch tube. The agricultural tillage implement has a left wing section and a right wing section pivotally coupled with the main frame section. The left and right wing sections are operable to pivot forward to positions adjacent to and generally parallel with the pull hitch tube when in a transport configuration, and are operable to pivot outward to positions perpendicular to the pull hitch tube when in an operating configuration. At least one left wing implement is pivotally coupled with the left wing section, and at least one right wing implement is pivotally coupled with the right wing section.

The wing implements are operable to pivot to generally vertical positions when in the transport configuration and are operable to pivot to generally horizontal positions when in the operating configuration. A hydraulic system has at least one left hydraulic circuit supplying hydraulic pressure and flow to at least one left wing hydraulic subsystem for actuating the at least one left wing implement. The hydraulic system also has at least one right hydraulic circuit supplying hydraulic pressure and flow to at least one right wing hydraulic subsystem for actuating the at least one right wing implement. The hydraulic system has at least one hydraulic flow divider and combiner dividing hydraulic flow and pressure between the at least one left hydraulic circuit and the at least one right hydraulic circuit. The at least one hydraulic flow divider and combiner functions to coordinate the motion of the at least one left wing implement and the at least one right wing implement.

The invention in another form is directed to a hydraulic system for an agricultural tillage implement having a main frame section including a telescoping pull hitch tube extending in a travel direction, and a tool bar attached to and extending transverse to the telescoping pull hitch tube. The agricultural tillage implement has a left wing section and a right wing section pivotally coupled with the main frame section. The left and right wing sections are operable to pivot forward to positions adjacent to and generally parallel with the pull hitch tube when in a transport configuration, and are operable to pivot outward to positions perpendicular to the pull hitch tube when in an operating configuration. At least one left wing implement is pivotally coupled with the left wing section and at least one right wing implement is pivotally coupled with the right wing section.

The wing implements are operable to pivot to generally vertical positions when in the transport configuration and are operable to pivot to generally horizontal positions when in the operating configuration. A main shank frame is pivotally coupled with the tool bar. The main shank frame is operable to pivot up and over the tool bar when in the transport configuration, and is operable to pivot down and forward of the tool bar when in the operating configuration. The hydraulic system has at least one left hydraulic circuit supplying hydraulic pressure and flow to at least one left wing hydraulic subsystem for actuating the at least one left wing implement. The hydraulic system also has at least one right hydraulic circuit supplying hydraulic pressure and flow to at least one right wing hydraulic subsystem for actuating the at least one right wing implement. At least one hydraulic flow divider and combiner divides hydraulic flow and pressure between the at least one left hydraulic circuit and the at least one right hydraulic circuit. The at least one hydraulic flow divider and combiner functions to coordinate the motion of the at least one left wing implement and the at least one right wing implement.

The invention in yet another form is directed to a hydraulic system for an agricultural tillage implement having a main frame section including a telescoping pull hitch tube extending in a travel direction, and a tool bar attached to and extending transverse to the telescoping pull hitch tube. The agricultural tillage implement has a left wing section and a right wing section pivotally coupled with the main frame section. The left and right wing sections are operable to pivot forward to positions adjacent to and generally parallel with the pull hitch tube when in a transport configuration, and are operable to pivot outward to positions perpendicular to the pull hitch tube when in an operating configuration. A left pivoting swing arm is connected to the left wing section and to a left diagonal draft tube. The left diagonal draft tube is further connected to the telescoping pull hitch. A right pivoting swing arm is connected to the right wing section and to a right diagonal draft tube. The right diagonal draft tube is further connected to the telescoping pull hitch.

A left pivoting swing arm hydraulic cylinder actuates the left pivoting swing arm and a right pivoting swing arm hydraulic cylinder actuates the right pivoting swing arm. A left main fold hydraulic cylinder actuates the left wing section and a right main fold hydraulic cylinder actuates the right wing section. The left pivoting swing arm hydraulic cylinder, the right pivoting swing arm hydraulic cylinder, the left main fold hydraulic cylinder, and the right main fold hydraulic cylinder receive hydraulic flow and pressure by way of a first solenoid operated normally closed two way poppet valve, a first hydraulic flow control valve, and a wing fold hydraulic flow divider and combiner. The wing fold hydraulic flow divider and combiner divides and combines hydraulic flow and pressure between a left wing fold hydraulic circuit supplying the left pivoting swing arm hydraulic cylinder and the left main fold hydraulic cylinder and a right wing fold hydraulic circuit supplying the right pivoting swing arm hydraulic cylinder and the right main fold hydraulic cylinder.

The left pivoting swing arm hydraulic cylinder and the left main fold hydraulic cylinder are hydraulically connected to the left wing fold hydraulic circuit in parallel, so that the left pivoting swing arm hydraulic cylinder is in line with and precedes a left pivoting swing arm hydraulic flow control valve, and so that the left main fold hydraulic cylinder is in line with and follows a left main fold hydraulic flow control valve. The left pivoting swing arm hydraulic flow control valve and the left main fold hydraulic flow control valve function to cause the left pivoting swing arm to pivot inward prior to the left wing section pivoting forward when transitioning from the operating configuration to the transport configuration, and to cause the left wing section to pivot outward prior to the left pivoting swing arm pivoting outward when transitioning from the transport configuration to the operating configuration.

The right pivoting swing arm hydraulic cylinder and the right main fold hydraulic cylinder are hydraulically connected to the right wing fold hydraulic circuit in parallel, so that the right pivoting swing arm hydraulic cylinder is in line with and precedes a right pivoting swing arm hydraulic flow control valve, and so that the right main fold hydraulic cylinder is in line with and follows a right main fold hydraulic flow control valve. The right pivoting swing arm hydraulic flow control valve and the right main fold hydraulic flow control valve function to cause the right pivoting swing arm to pivot inward prior to the right wing section pivoting forward when transitioning from the operating configuration to the transport configuration, and to cause the right wing section to pivot outward prior to the right pivoting swing arm pivoting outward when transitioning from the transport configuration to the operating configuration.

An advantage of the present invention is that the agricultural tillage implement may be quickly and efficiently reconfigured from the operating configuration to the transport configuration. Another advantage is that the transport configuration of the agricultural tillage implement is kept within manageable limits while still allowing for the desired width and functionality of the agricultural tillage implement when in the operating configuration. Another advantage is that reconfiguring the agricultural tillage implement from operating configuration to transport configuration and vice versa is accomplished without excessive time and difficulty on the part of the operator, and without requiring the operator to exit the operator cab.

Another advantage of the present invention is that it folds and unfolds the wing front shank frames and the wing section rear auxiliary implements in a coordinated fashion when transitioning to the transport configuration and to the operating configuration, respectively. Another advantage is that it folds and unfolds the main shank frame in a coordinated fashion with the wing front shank frames and the wing section rear auxiliary implements when transitioning to the transport configuration and to the operating configuration, respectively. Another advantage is that it raises the pull hitch tube and the tool bars when transitioning to the transport configuration, and lowers the pull hitch tube and the tool bars when transitioning to the operating configuration, in a coordinated fashion with the folding and unfolding of the wing front shank frames and the wing section rear auxiliary implements, and with the folding and unfolding of the main shank frame. Another advantage is that it retracts the gauge wheels when transitioning to the transport configuration, and extends the gauge wheels when transitioning to the operating configuration, in a coordinated fashion with the folding and unfolding of the wing front shank frames and the wing section rear auxiliary implements, and with the folding and unfolding of the main shank frame.

Another advantage of the present invention is that it pivots the pivoting swing arms inwards when transitioning to the transport configuration, pivots the pivoting swing arms outwards when transitioning to the operating configuration, folds the wing sections forward when transitioning to the transport configuration, and folds the wing sections outward when transitioning to the operating configuration, in coordinated fashion, and in coordination with the folding and unfolding of the wing front shank frames, the wing section rear auxiliary implements, and the main shank frame, and in coordination with the locking and unlocking of the hitch lock.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
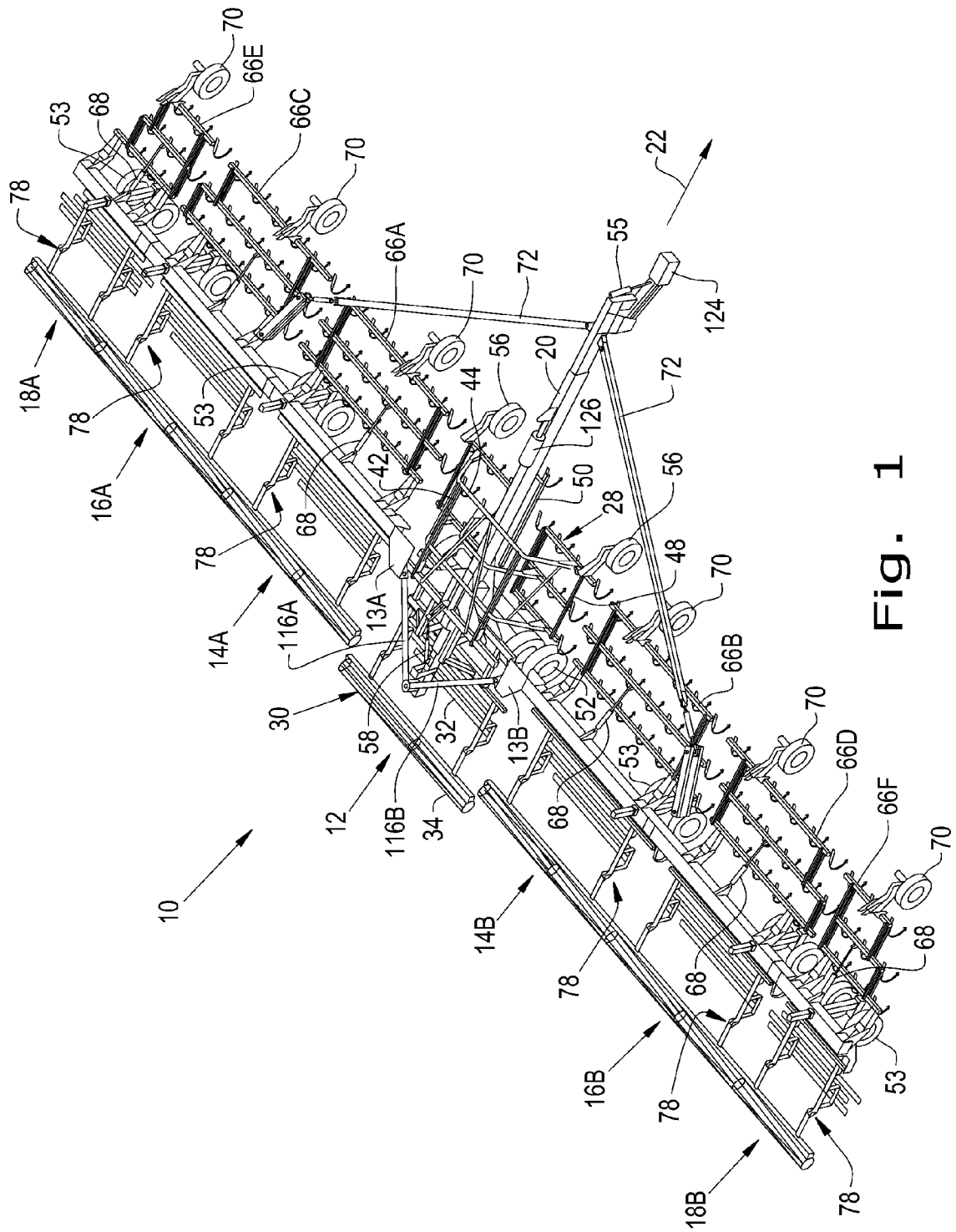
FIG. 1 is a top perspective view of an embodiment of an agricultural tillage implement of the present invention, in the form of a field cultivator.

Referring now to the drawings, and more particularly to FIGS. 1 through 6, there is shown an embodiment of an agricultural tillage implement of the present invention. In the illustrated embodiment, the agricultural tillage implement 10 is in the form of a field cultivator for tilling and finishing soil prior to seeding.

Agricultural tillage implement 10 is configured as a multi-section field cultivator, and includes a main frame section 12 and a plurality of wing sections 14A, 14B, 16A, 16B, 18A, and 18B. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections. Intermediate wings 13A and 13B may be attached to main frame section 12, and may provide generally vertical axes 86 and 88 about which the plurality of wing sections 14A, 14B, 16A, 16B, 18A, and 18B pivot.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20. Reinforcing gusset plates 26 may be used to strengthen the connection between pull hitch tube 20 and tool bar 24. Main frame section 12 generally functions to carry a main shank frame 28 for tilling the soil, and a main rear auxiliary implement 30 for finishing the soil. Main rear auxiliary implement 30 includes a spring tooth drag 32 and a rolling (aka, crumbler) basket 34 which coact with each other to finish the soil. However, main rear auxiliary implement 30 can be differently configured, such as a spike tooth drag, cultivator shanks, etc.

Figure 2:
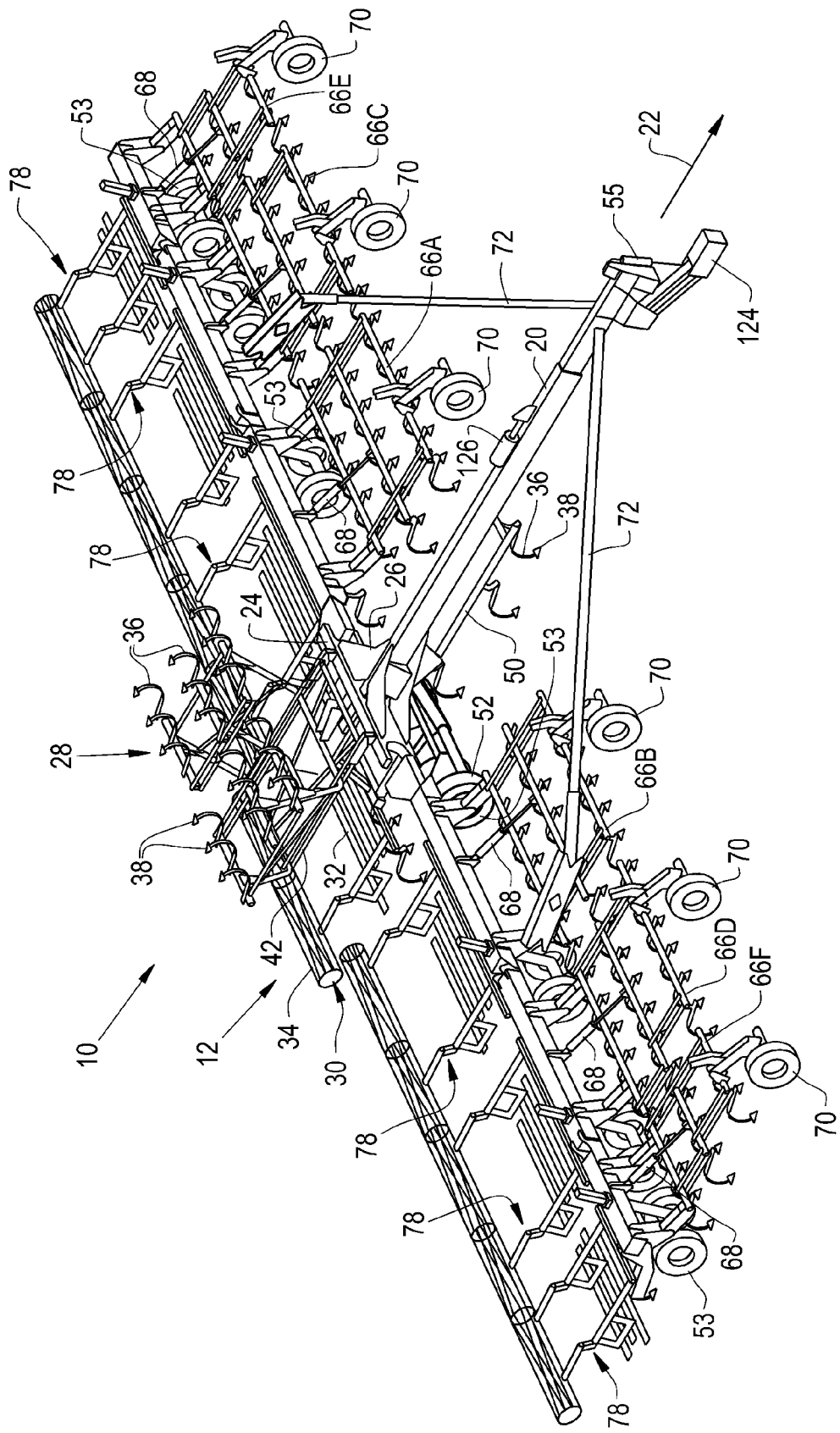
FIG. 2 is the same top perspective view shown in FIG. 1, with the main shank frame folded to a transport configuration.
Figure 3:
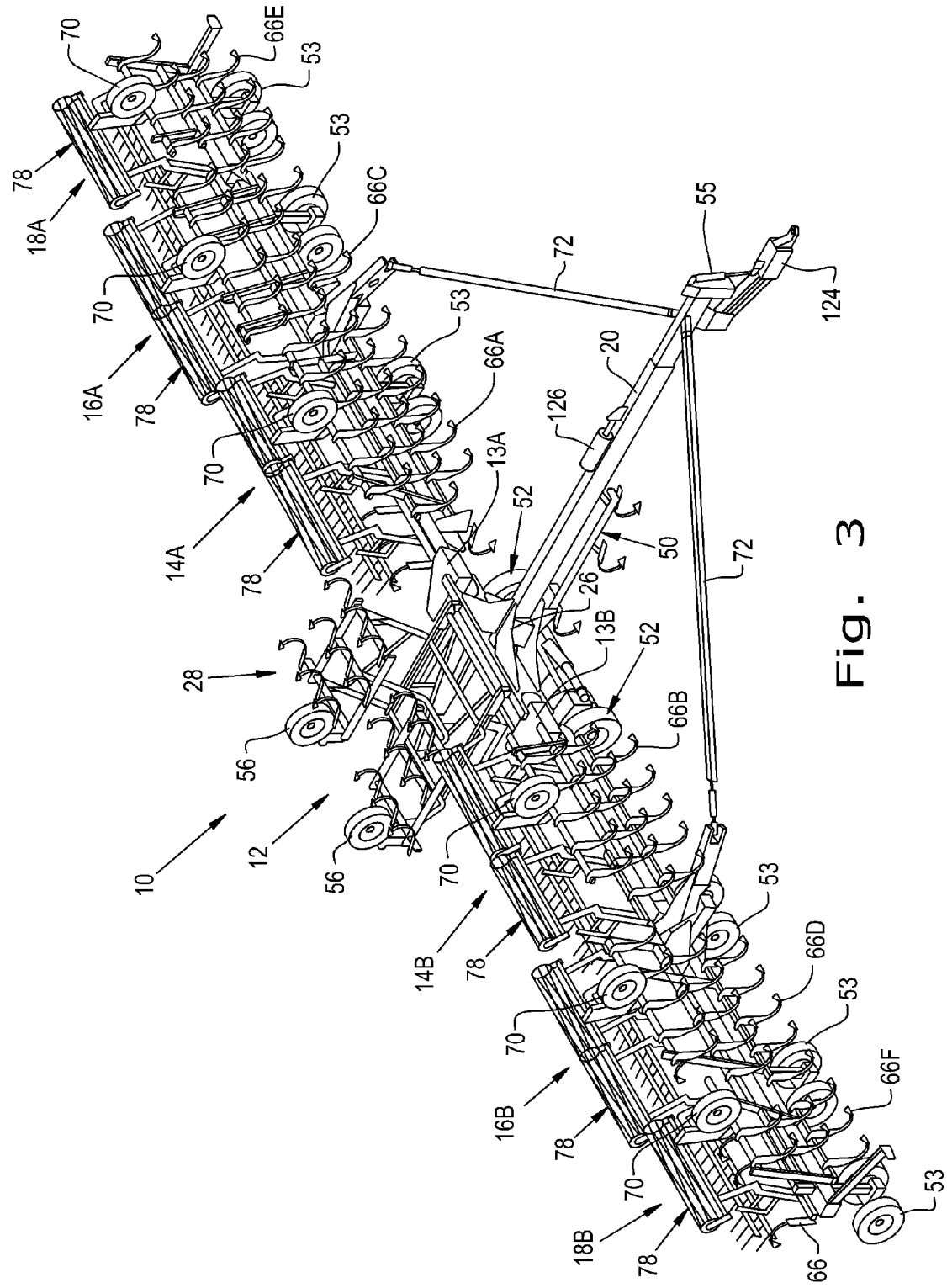
FIG. 3 is a top perspective view of the agricultural tillage implement shown in FIGS. 1-2, with the main shank frame folded rearward to a transport configuration and the wing front shank frames and wing section rear auxiliary implements folded upwards to a transport configuration.
Figure 4:
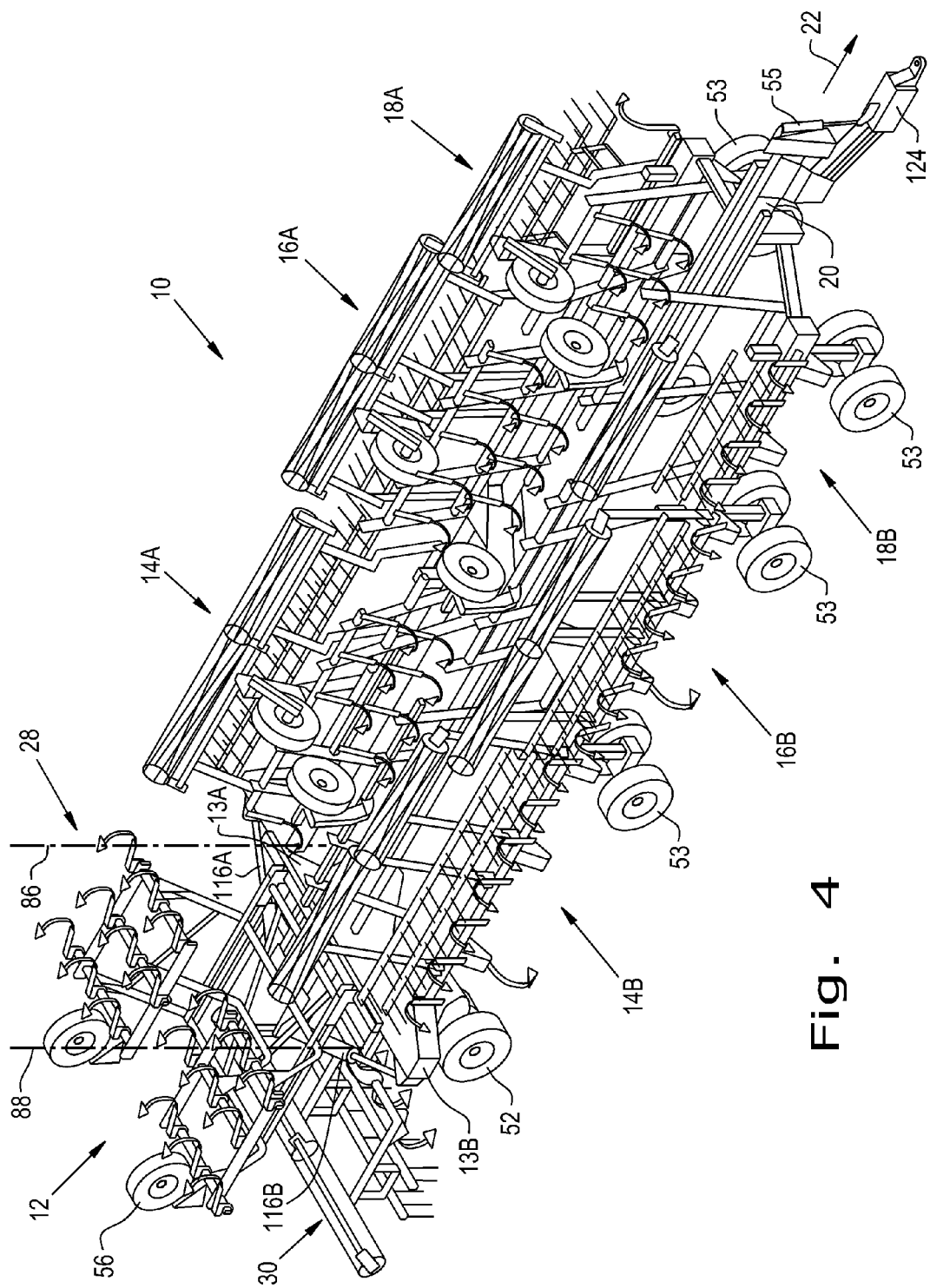
FIG. 4 is a top perspective view of the agricultural tillage implement shown in FIGS. 1-3, with the wing sections folded forward about at least one generally vertical axis to a transport configuration.

Main shank frame 28 generally functions to carry cultivator shanks 36 with shovels 38 at their lower ends for tilling the soil. Main shank frame 28 is pivotally coupled with tool bar 24, preferably at the top of tool bar 24, such as with couplings 40. Main shank frame 28 is positioned in front of the tool bar 24 when in an operating configuration (FIG. 1), and is foldable up and over the tool bar 24 to a position rearward of tool bar 24 when in a transport configuration (FIGS. 2-4). Main shank frame 28 includes two sets of longitudinal frame members 42 which are pivotally coupled with tool bar 24 at one end. A plurality of cross frame members 44 are coupled with the longitudinal frame members 42. Each of the cross frame members 44 extend horizontally past longitudinal frame members 42, then in a downwardly angled direction, whereby their outboard ends are positioned on opposite lateral sides of the pull hitch tube 20 when in an operating configuration. The outboard ends of the cross frame members 44 are coupled with a pair of respective main shank sub-frames 48. Main shank sub-frames 48 are spaced apart from each other in a direction transverse to pull hitch tube 20 and are positioned on respective opposite lateral sides of pull hitch tube 20 when in an operating configuration.

A center shank sub-frame 50 is attached to and positioned below pull hitch tube 20. Since main shank sub-frames 48 are spaced apart on either side of pull hitch tube 20, center shank sub-frame 50 functions to till the soil in the intermediate open space between the two main shank sub-frames 48. Center shank sub-frame 50 includes a number of cultivator shanks 36 and corresponding shovels 38; three in the illustrated embodiment. Center shank sub-frame 50 may be raised up and down with the raising and lowering of the main frame section 12 using rear lift wheels 52 using hydraulic cylinder 54 and using hydraulic cylinder 55 connected to pull hitch 124. Alternately, center shank sub-frame 50 may be raised or lowered independently of main frame section 12.

Main shank frame 28 also includes one or more gauge wheel assemblies 56 which function to level main shank sub-frames 48. In the illustrated embodiment, main shank frame 28 includes two gauge wheel assemblies 56 which are respectively coupled with a front of a respective main shank sub-frame 48. A hydraulic cylinder 58 is used to fold main shank frame 28 from the operating configuration to the transport configuration, and vice versa. Hydraulic cylinder 58 may optionally be placed in a "float mode" such that gauge wheel assemblies 56 are operable to float up and down as they traverse across a field and thereby set the operating depth at the front edge of main shank frame 28.

Figure 7:
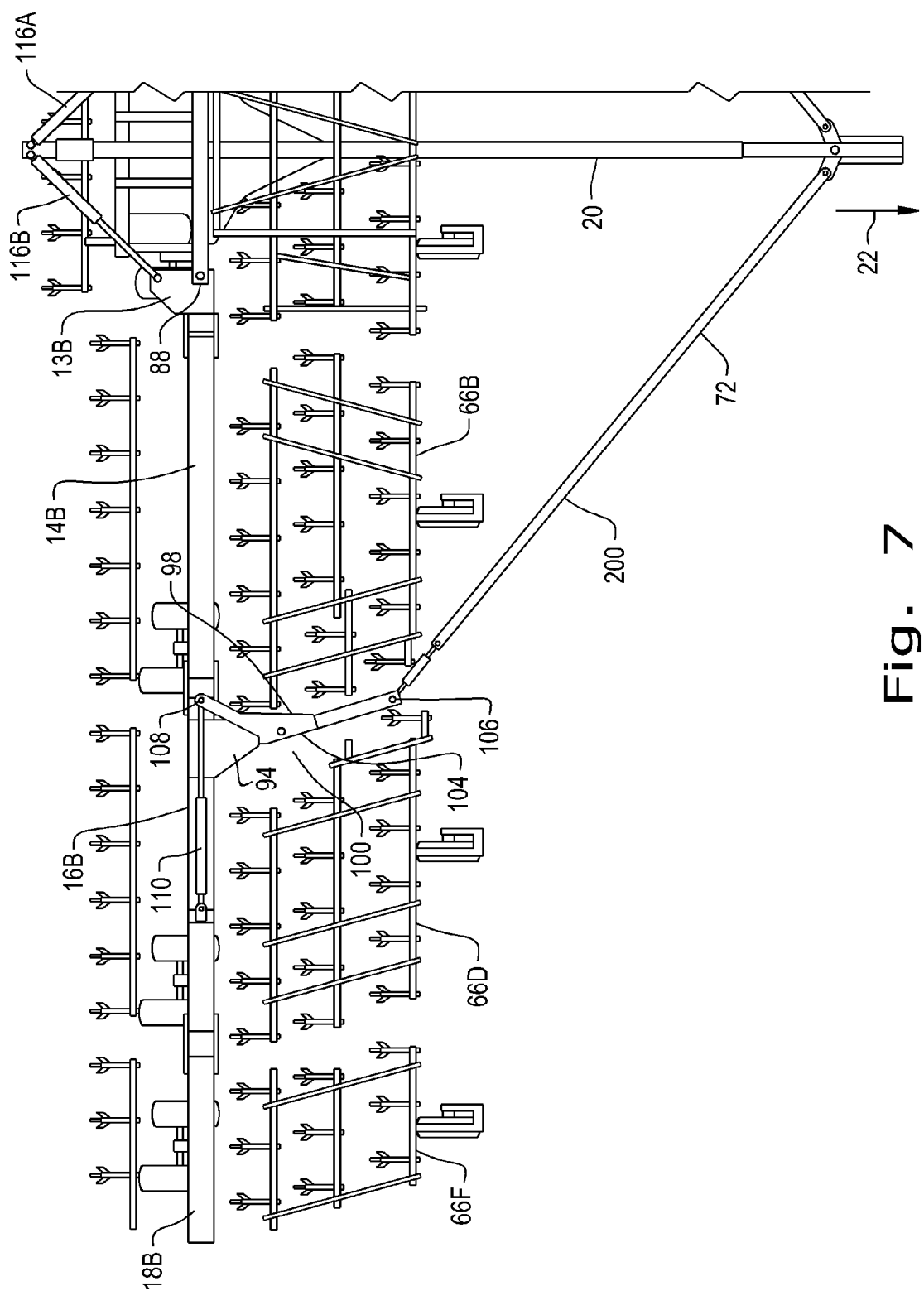
FIG. 7 is a partial top view of the agricultural tillage implement showing additional detail of the draft linkage assembly.

Turning now to FIG. 7, a draft linkage assembly 200 includes diagonally angled draft tubes 72. A standoff bracket 94 extends forward from right middle wing section 16B, though such standoff bracket 94 could also be attached to right inner wing section 14B or right outer wing section 18B. Main fold hydraulic cylinders 116A and 116B are shown in a rear mounted configuration, so that for example right main fold hydraulic cylinder 116B acts on intermediate wing 13B of wing sections 14B, 16B, and 18B directly. It is also contemplated that main fold hydraulic cylinder may be mounted longitudinally on telescoping pull hitch tube 20, causing extending telescoping pull hitch tube 20 to pull wing sections 14B, 16B, and 18B into the transport configuration by action of the draft linkage assembly 200.

Draft linkage assembly 200 is further provided with pivoting swing arm 98, which is configured as a bell crank arrangement 100. Bell crank arrangement 100 has a pivoting swing arm center pivot 104, which is connected to the standoff bracket 94, as well as a pivoting swing arm second pivot 106, which is connected to the diagonally angled draft tube 72. A pivoting swing arm third pivot 108 is connected to a pivoting swing arm hydraulic cylinder 110, which serves to rotate pivoting swing arm 98 inwards toward right inner wing section 14B upon contraction, and serves to rotate pivoting swing arm 98 outwards upon extension. Note that draft linkage assembly 200 as shown in FIG. 7 has pivoting swing arm hydraulic cylinder 110 located outwards along right middle wing section 16B from standoff bracket 94. An alternate embodiment would place pivoting swing arm hydraulic cylinder 110 inwards along right middle wing section 16B from standoff bracket 94, such that pivoting swing arm hydraulic cylinder 110 would cause pivoting swing arm 98 to pivot inwards toward right inner wing section 14B upon extension, and outwards upon contraction.

Standoff bracket 94 extends sufficiently forward from right middle wing section 16B so that when wing front shank frames 66, shown here as right wing front shank frames 66B, 66D, and 66F, are rotated to their generally vertical positions, standoff bracket 94 extends beyond the wing front shank frames 66A, 66B, 66C, 66D, 66E, and 66F. In this way, pivoting swing arm 98 does not interfere with right inner wing front shank frame 66B when pivoting swing arm 98 pivots inwards towards right inner wing section 14B. Pivoting the pivoting swing arm 98 inwards towards right inner wing section 14B allows wing sections 14B, 16B, and 18B to fold to the transport configuration as diagonally angled draft tube 72 nests with pivoting swing arm 98, whereas pivoting the pivoting swing arm 98 outwards allows wing sections 14B, 16B, and 18B to unfold to the operating configuration while still allowing right inner wing shank frame 66B to pivot to the generally horizontal position. A symmetrically opposite draft linkage assembly 200 is of course provided for left inner wing section 14A, left middle wing section 16A, and left outer wing section 18A.

During use, it is periodically necessary to move the agricultural tillage implement 10 from an unfolded (operating) configuration to a folded (transport) configuration. Hydraulic cylinder 54 may first be actuated to lift the main frame section 12 to the raised transport configuration using rear lift wheels 52 in cooperation with hydraulic cylinder 55 connected to pull hitch 124. Center shank sub-frame 50 may then be independently moved to a raised position if agricultural tillage implement 10 is provided with an independently movable center shank sub-frame 50. Toolbar lift wheels 53 lift wing sections 14A, 14B, 16A, 16B, 18A, and 18B to the raised transport position along with main frame section 12, which toolbar lift wheels 53 are then allowed to caster or pivot.

Hydraulic cylinder 58 is then retracted to fold main shank frame 28 up and over tool bar 24 to an inverted position above and rearward of tool bar 24 (FIGS. 2-6). Crumbler basket 34 of main rear auxiliary implement 30 may then also be moved to a raised position. Then the wing front shank frames 66A, 66B, 66C, 66D, 66E, and 66F of the wing sections 14A, 14B, 16A, 16B, 18A, and 18B are folded upwards (FIG. 3) to a position at or near vertical by retracting hydraulic cylinders 68 (not visible in FIG. 3). Gauge wheel assemblies 56 and 70 may also be retracted at this point. Wing front shank frames 66A, 66B, 66C, 66D, 66E, and 66F of the wing sections 14A, 14B, 16A, 16B, 18A, and 18B may be folded upwards to the generally vertical position at the same time, or may be folded upwards to the generally vertical position sequentially. One or more hydraulic flow divider and combiners may be used to coordinate the motion of wing front shank frames 66A, 66B, 66C, 66D, 66E, and 66F of the wing sections 14A, 14B, 16A, 16B, 18A, and 18B, as will be shown.

Wing section rear auxiliary implements 78, which may include spring tooth drags, crumbler baskets, spike tooth drags, cultivator shanks, or any combination thereof, may then also be folded upwards to a position at or near vertical by extending hydraulic cylinders 90. Wing section rear auxiliary implements 78 may also be folded upwards to a generally vertical position at the same time, or may be folded upwards to the generally vertical position sequentially. One or more hydraulic flow divider and combiners may be used to coordinate the motion of wing section rear auxiliary implements 78 with each other and with wing front shank frames 66A, 66B, 66C, 66D, 66E, and 66F of the wing sections 14A, 14B, 16A, 16B, 18A, and 18B, as will be shown. Further, crumbler basket 34 of main rear auxiliary implement 30 may be moved to its raised position at the same time that wing section rear auxiliary implements 78 are folded upwards to their generally vertical positions.

A telescoping hitch lock cylinder 126 is then retracted, releasing pull hitch tube 20 to telescope. Diagonally angled draft tubes 72 extending between a forward end of pull hitch tube 20 and a respective tool bar 24 associated with the pair of middle wing sections 16A and 16B are then folded inward using pivoting swing arm hydraulic cylinders 110 and pivoting swing arms 98 of draft linkage assembly 200. Wing sections 14A, 14B, 16A, 16B, 18A, and 18B are then folded forward by left main fold hydraulic cylinder 116A and right main fold hydraulic cylinder 116B about generally vertical axes 86 and 88 which pass through intermediate wings 13A and 13B to a position adjacent to and generally parallel with pull hitch tube 20 (FIG. 4). Gauge wheel assemblies 56 at the front of main shank frame 28 and gauge wheel assemblies 70 at the front of wing sections 14A, 14B, 16A, 16B, 18A, and 18B are all configured as caster wheels and are not in contact with the ground when agricultural tillage implement 10 is in the folded or transport configuration. For unfolding the agricultural tillage implement 10 to the operating configuration, the reverse folding sequence is carried out.

Figure 5:
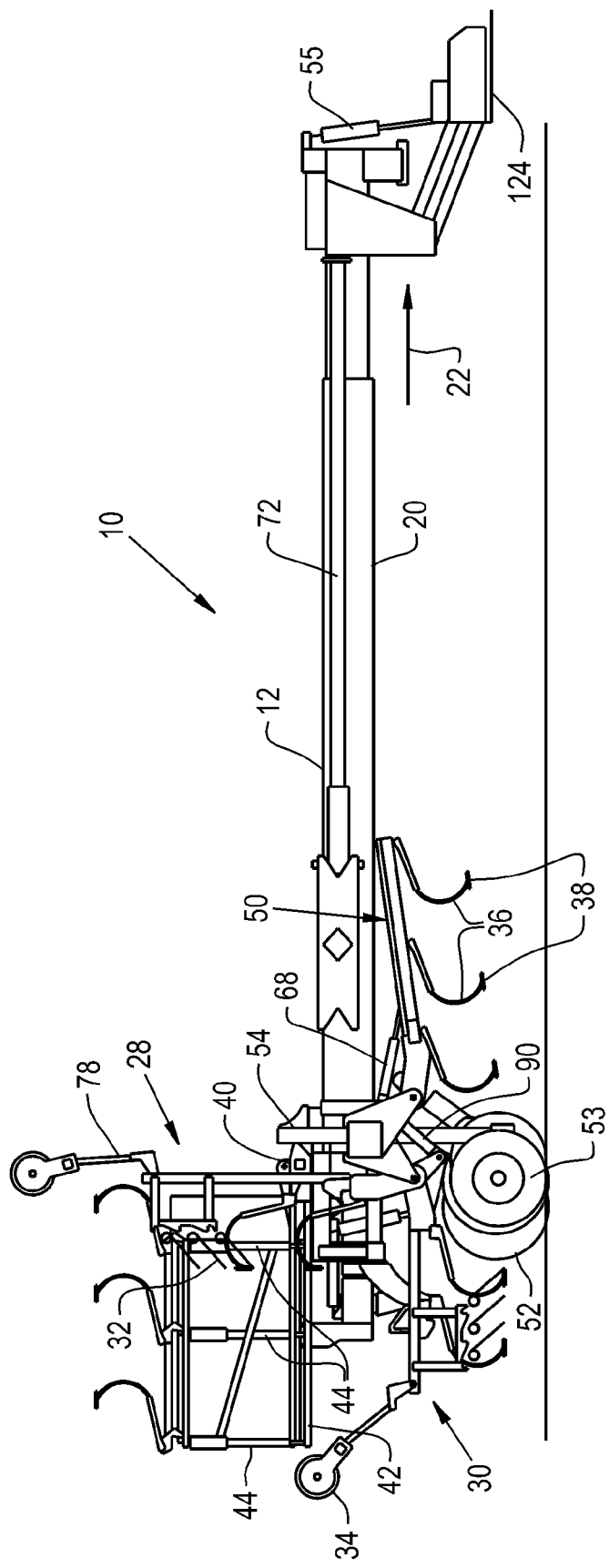
FIG. 5 is a side view of the agricultural tillage implement shown in FIGS. 1-4, with the main shank frame in the transport position, the main frame lifted, the center shank sub-frame raised, the crumbler basket of the main rear auxiliary implement raised, and the wing section rear auxiliary implements in their generally vertical positions.
Figure 6:
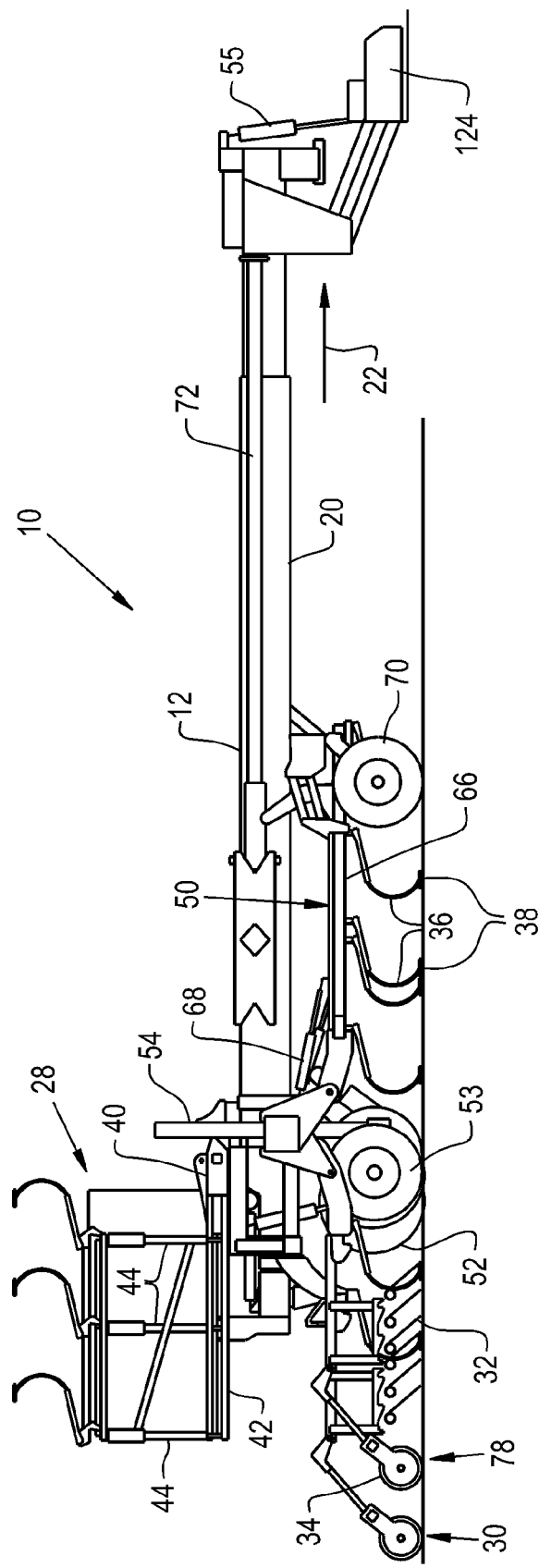
FIG. 6 is another side view of the agricultural tillage implement, similar to FIG. 5, with the main shank frame shown in the transport position for clarity, the main frame lowered, the center shank sub-frame lowered, the crumbler basket of the main rear auxiliary implement lowered, and the wing front shank frames and wing section rear auxiliary implements in their generally horizontal positions.

FIG. 5 shows a side view of the agricultural tillage implement shown in FIGS. 1-4, with the main shank frame 28 in the transport position, the main frame 12 lifted, the center shank sub-frame 50 raised, and the crumbler basket 34 of the main rear auxiliary implement 30 raised. For clarity, the wing front shank frames 66A, 66B, 66C, 66D, 66E, and 66F and the wing section rear auxiliary implements 78 are not shown. FIG. 6 shows another side view of the agricultural tillage implement, similar to FIG. 5, with the main shank frame 28 shown in the transport position for clarity, the main frame 12 lowered, the center shank sub-frame 50 lowered, the crumbler basket 34 of the main rear auxiliary implement 30 and of the wing section rear auxiliary implements lowered, and the wing front shank frames 66A, 66B, 66C, 66D, 66E, and 66F and wing section rear auxiliary implements 78 in their generally horizontal positions;

The folding sequence of steps to reconfigure the agricultural tillage implement from an operating configuration to a transport configuration may therefore include pivoting the main shank frame 28 up and over the tool bar 24 by retracting hydraulic cylinder 58, pivoting the wing front shank frames 66A, 66B, 66C, 66D, 66E, and 66F to a generally vertical position by retracting hydraulic cylinders 68 and locking the wing front shank frames 66A, 66B, 66C, 66D, 66E, and 66F in the generally vertical position, retracting gauge wheel assemblies 56 and 70, retracting a telescoping hitch lock cylinder 126, folding diagonally angled draft tubes 72 inward using pivoting swing arm hydraulic cylinders 110 and pivoting swing arms 98 of draft linkage assembly 200, and pivoting the wing sections 14A, 14B, 16A, 16B, 18A, and 18B about generally vertical axes 86 and 88 to a position adjacent to and generally parallel with the pull hitch tube 20 using main fold hydraulic cylinders 116. One or more hydraulic flow divider and combiners, hydraulic flow restrictors, and/or solenoid valves may be used to coordinate this motion, as will be shown.

The folding sequence of steps to reconfigure the agricultural tillage implement from an operating configuration to a transport configuration may alternately include raising the main frame section 12 using hydraulic cylinder 54 connected to rear lift wheels 52 and using hydraulic cylinder 55 connected to pull hitch 124 while raising the wing sections 14A, 14B, 16A, 16B, 18A, and 18B using the toolbar lift wheels 53, raising the center shank sub-frame 50, pivoting the main shank frame 28 up and over the tool bar 24 by retracting hydraulic cylinder 58, raising the crumbler basket 34 of the main rear auxiliary implement 30, pivoting the wing front shank frames 66A, 66B, 66C, 66D, 66E, and 66F to a generally vertical position by retracting hydraulic cylinders 68 and locking the wing front shank frames 66A, 66B, 66C, 66D, 66E, and 66F in the generally vertical position, retracting gauge wheel assemblies 56 and 70, pivoting the wing section rear auxiliary implements 78 to a generally vertical position by extending hydraulic cylinders 90 and locking the wing section rear auxiliary implements 78 in the generally vertical position, retracting a telescoping hitch lock cylinder 126, folding diagonally angled draft tubes 72 inward using pivoting swing arm hydraulic cylinders 110 and pivoting swing arms 98 of draft linkage assembly 200, and pivoting the wing sections 14A, 14B, 16A, 16B, 18A, and 18B about generally vertical axes 86 and 88 to a position adjacent to and generally parallel with the pull hitch tube 20 using main fold hydraulic cylinders 116. Again, one or more hydraulic flow divider and combiners and/or hydraulic flow restrictors, as well as solenoid valves and spring biased directional control valves may be used to coordinate these motions, as will be shown. The folding sequence of steps to reconfigure the agricultural tillage implement from an operating configuration to a transport configuration may further include pivoting the wing front shank frames 66A, 66B, 66C, 66D, 66E, and 66F to a generally vertical position in a sequential manner.

The unfolding sequence of steps to reconfigure the agricultural tillage implement from a transport configuration to an operating configuration may therefore include pivoting the wing sections 14A, 14B, 16A, 16B, 18A, and 18B outward about generally vertical axes 86 and 88 to a position perpendicular to the pull hitch tube 20 using main fold hydraulic cylinders 116, folding diagonally angled draft tubes 72 outward using pivoting swing arm hydraulic cylinders 110 and pivoting swing arms 98 of draft linkage assembly 200, extending a telescoping hitch lock hydraulic cylinder 126, unlocking and pivoting the wing front shank frames 66A, 66B, 66C, 66D, 66E, and 66F to a generally horizontal position by extending hydraulic cylinders 68, pivoting the main shank frame 28 down and forward of the tool bar 24 by extending hydraulic cylinder 58, and extending gauge wheel assemblies 56 and 70.

The unfolding sequence of steps to reconfigure the agricultural tillage implement from a transport configuration to an operating configuration may alternately include pivoting the wing sections 14A, 14B, 16A, 16B, 18A, and 18B outward about generally vertical axes 86 and 88 to a position perpendicular to the pull hitch tube 20 using main fold hydraulic cylinders 116, folding diagonally angled draft tubes 72 outward using pivoting swing arm hydraulic cylinders 110 and pivoting swing arms 98 of draft linkage assembly 200, extending a telescoping hitch lock hydraulic cylinder 126, unlocking and pivoting the wing front shank frames 66A, 66B, 66C, 66D, 66E, and 66F to a generally horizontal position by extending hydraulic cylinders 68, unlocking and pivoting the wing section rear auxiliary implements 78 to a generally horizontal position by retracting hydraulic cylinders 90, pivoting the main shank frame 28 down and forward of the tool bar 24 by extending hydraulic cylinder 58, extending gauge wheel assemblies 56 and 70, lowering the crumbler basket 34 of the main rear auxiliary implement 30, lowering the center shank sub-frame 50, and lowering the main frame section 12 using hydraulic cylinder 54 connected to rear lift wheels 52 and using hydraulic cylinder 55 connected to pull hitch 124 while lowering the wing sections 14A, 14B, 16A, 16B, 18A, and 18B using the toolbar lift wheels 53. Again, one or more hydraulic flow divider and combiners and/or hydraulic flow restrictors may be used to coordinate these motions, as will be shown. The unfolding sequence of steps to reconfigure the agricultural tillage implement from a transport configuration to an operating configuration may further include pivoting the wing front shank frames 66A, 66B, 66C, 66D, 66E, and 66F to a generally horizontal position in a sequential manner.

Figure 8:
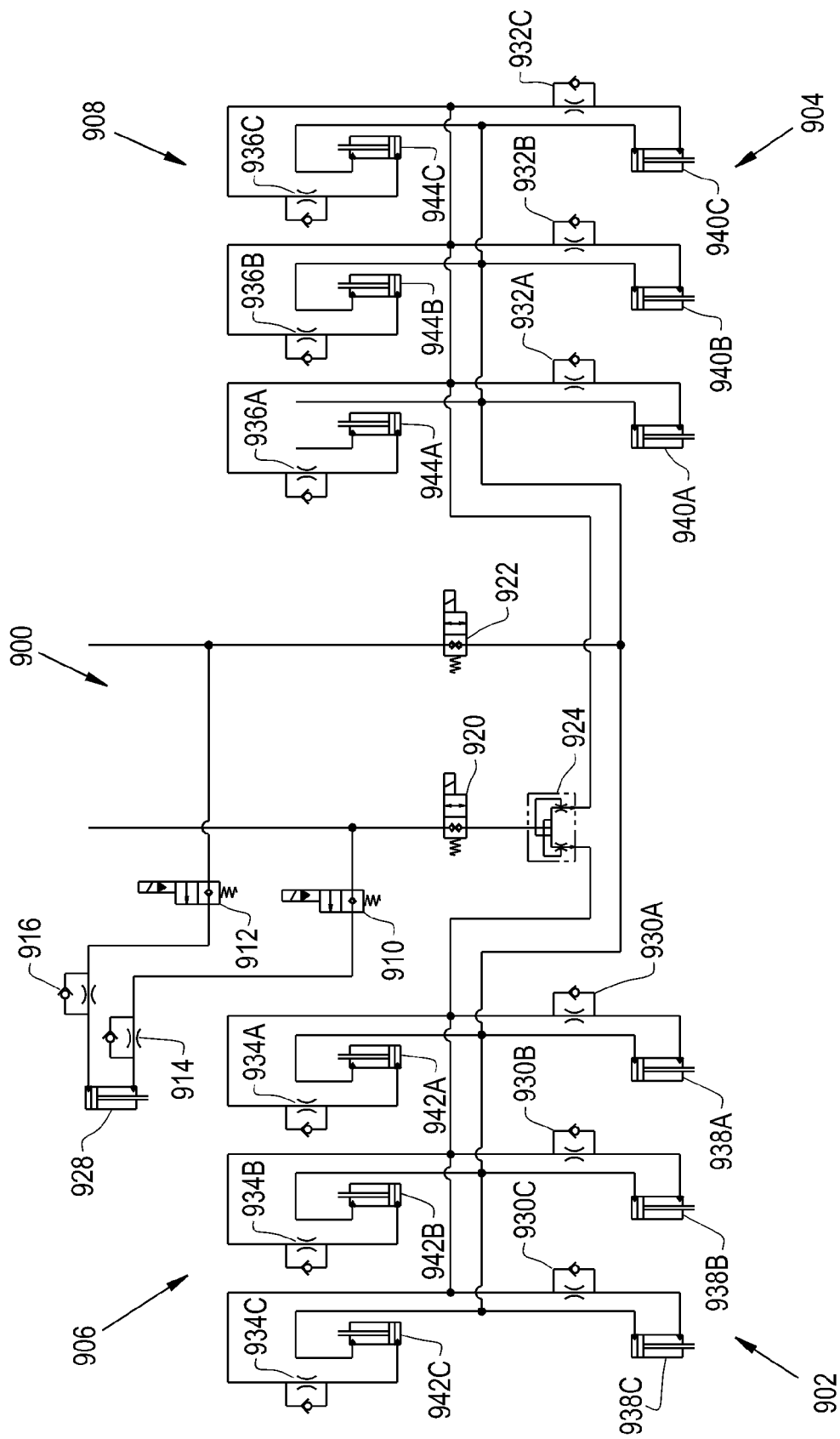
FIG. 8 is a schematic illustration of a tillage implement hydraulic system according to an embodiment of the present invention.

Turning now to FIG. 8, a schematic illustration of a tillage implement hydraulic system 900 according to one embodiment of the present invention is shown. The tillage implement hydraulic system 900 includes a right wing front shank frame hydraulic subsystem 902, a left wing front shank frame hydraulic subsystem 904, a right wing rear auxiliary implement hydraulic subsystem 906, and a left wing rear auxiliary implement hydraulic subsystem 908. When transitioning from the operating configuration to the transport configuration, hydraulic pressure and flow is admitted to the tillage implement hydraulic system 900, whereupon part of the hydraulic pressure and flow then proceeds to the to the main shank frame hydraulic cylinder 928 by way of first main shank frame solenoid operated normally closed two position one way valve 910 and first main shank frame hydraulic flow control valve 914. Thereafter, this part of the hydraulic pressure and flow passes through second main shank frame hydraulic flow control valve 916 and second main shank frame solenoid operated normally closed two position one way valve 912.

Another part of the hydraulic pressure and flow then proceeds to 50/50 hydraulic flow divider and combiner 924 by way of first solenoid operated normally closed two way poppet valve 920. While the hydraulic flow divider and combiner 924 divides the flow in a 50/50 ratio in the embodiment illustrated, other ratios are contemplated. Hydraulic flow and pressure proceeding from the hydraulic flow divider and combiner 924, having been divided between hydraulic flow and pressure going to the right wing front shank frame hydraulic subsystem 902 and right wing rear auxiliary implement hydraulic subsystem 906, and that going to the left wing front shank frame hydraulic subsystem 904 and left wing rear auxiliary implement hydraulic subsystem 908, then passes through right wing front shank frame hydraulic flow control valves 930A, 930B, 930C, and right wing rear auxiliary implement hydraulic flow control valves 934A, 934B, 934C, and through left wing front shank frame hydraulic flow control valves 932A, 932B, 932C, and left wing rear auxiliary implement hydraulic flow control valves 936A, 936B, 936C, respectively. The hydraulic flow and pressure is then admitted into right wing front shank frame hydraulic cylinders 938A, 938B, 938C, and right wing rear auxiliary implement hydraulic cylinders 942A, 942B, 942C, and into left wing front shank frame hydraulic cylinders 940A, 940B, 940C, and left wing rear auxiliary implement hydraulic cylinders 944A, 944B, 944C, respectively.

Right wing front shank frame hydraulic cylinders 938A, 938B, and 938C, and left wing front shank frame hydraulic cylinders 940A, 940B, and 940C are functionally equivalent to the hydraulic cylinders 68 shown in FIGS. 1, 2, 5, and 6. Right wing rear auxiliary implement hydraulic cylinders 942A, 942B, and 942C, and left wing rear auxiliary implement hydraulic cylinders 944A, 944B, and 944C are functionally equivalent to the hydraulic cylinders 90 shown in FIG. 5.

Note that for illustration purposes, the main shank frame hydraulic cylinder 928 is shown acting in retraction, the wing front shank frame hydraulic cylinders 938A, 938B, 938C, 940A, 940B, 940C are shown acting in retraction, and the wing rear auxiliary implement hydraulic cylinders 942A, 942B, 942C, 944A, 944B, 944C are shown acting in extension. However, it is contemplated that any cylinder shown in the hydraulic diagram of FIG. 8 may be reversed in its direction of action, and still be within the scope of the present invention. The hydraulic flow and pressure then returns from the tillage implement hydraulic system 900 by way of second solenoid operated normally closed two way poppet valve 922.

By way of the hydraulic arrangement shown in FIG. 8, and by way of appropriate sizing of the hydraulic flow control valves 914, 916, 930A, 930B, 930C, 932A, 932B, 932C, 934A, 934B, 934C, 936A, 936B, and 936C, the tillage implement hydraulic system 900 functions to coordinate the motions of the main shank frame 28, the wing front shank frames 66A, 66B, 66C, 66D, 66E, and 66F, and the wing section rear auxiliary implements 78 as the agricultural tillage implement 10 transitions from the operating configuration to the transport configuration and vice versa. Specifically, the tillage implement hydraulic system 900 may function to raise the main shank frame 28 in advance of raising the wing front shank frames 66A, 66B, 66C, 66D, 66E, and 66F, and raising the wing section rear auxiliary implements 78 when transitioning from the operating configuration to the transport configuration. The tillage implement hydraulic system 900 may function to lower the wing front shank frames 66A, 66B, 66C, 66D, 66E, and 66F, and lower the wing section rear auxiliary implements 78 in advance of lowering the main shank frame 28 when transitioning from the transport configuration to the operating configuration.

Figure 9:
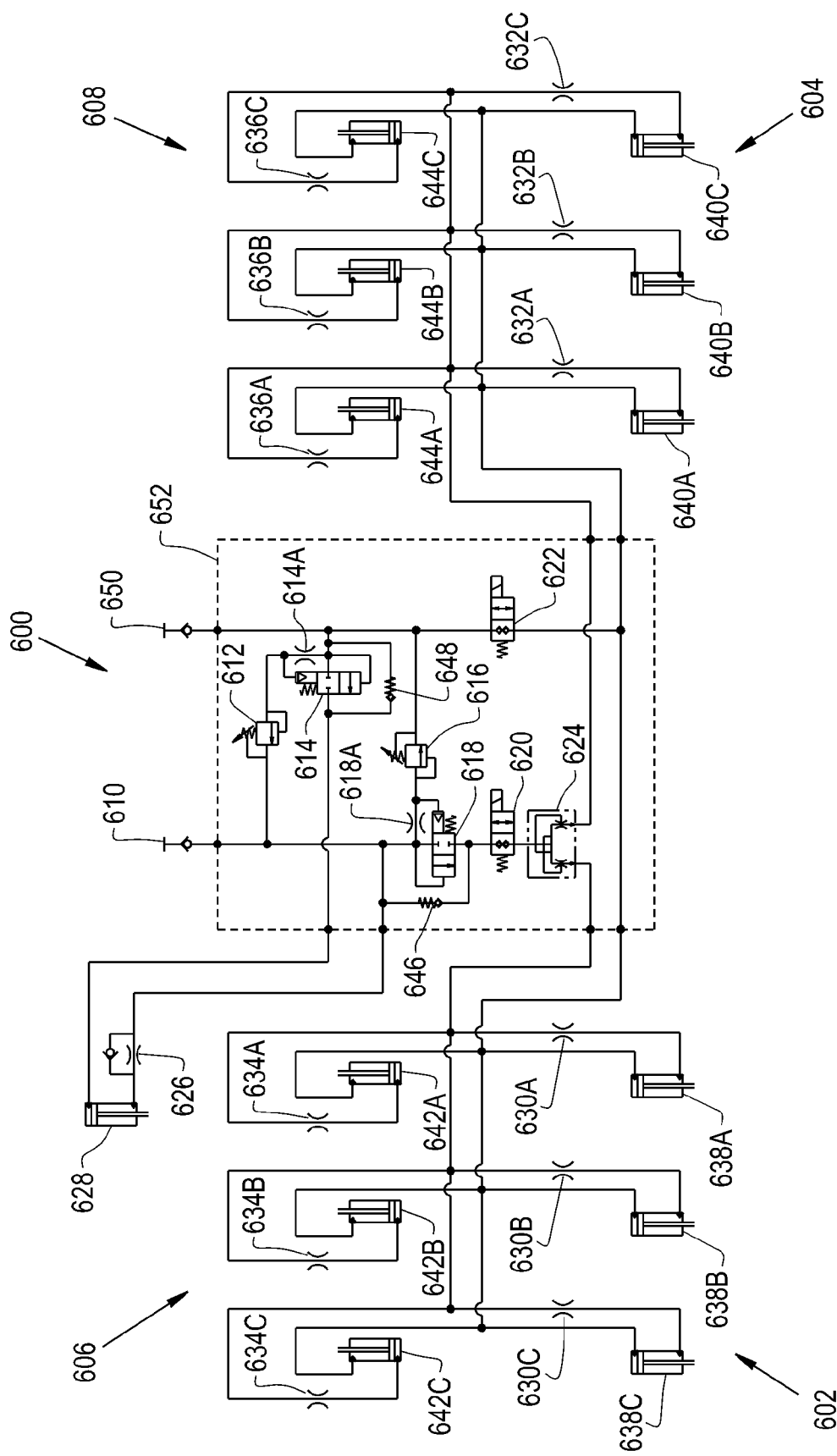
FIG. 9 is a schematic illustration of a tillage implement hydraulic system according to another embodiment of the present invention.

Turning now to FIG. 9, a schematic illustration of a tillage implement hydraulic system 600 according to another embodiment of the present invention is shown. The tillage implement hydraulic system 600 includes a right wing front shank frame hydraulic subsystem 602, a left wing front shank frame hydraulic subsystem 604, a right wing rear auxiliary implement hydraulic subsystem 606, and a left wing rear auxiliary implement hydraulic subsystem 608. When transitioning from the operating configuration to the transport configuration, hydraulic pressure and flow is admitted to the tillage implement hydraulic system 600, whereupon the hydraulic pressure and flow passes through a first check valve 610 upon entering manifold 652.

Part of the hydraulic pressure and flow then proceeds to main shank frame hydraulic cylinder 628 by way of main shank frame hydraulic flow control valve 626. Thereafter, this part of the hydraulic pressure and flow passes back into the manifold 652, then passes through a first spring biased vent to open directional blocking valve 614 in parallel with third check valve 648, and returns from the tillage implement hydraulic system 600 by way of fourth check valve 650. When transitioning from the transport configuration to the operating configuration, the hydraulic pressure and flow are reversed, with the first spring biased vent to open directional blocking valve 614 being piloted by hydraulic pressure taken from the tillage implement hydraulic system 600 immediately after fourth check valve 650 by way of a hydraulic flow restrictor 614A. Hydraulic pressure piloting the first spring biased vent to open directional blocking valve 614 is limited by a first hydraulic pressure control valve 612. The hydraulic flow then returns from the tillage implement hydraulic system 600 by way of first check valve 610.

When transitioning from the operating configuration to the transport configuration, another part of the hydraulic pressure and flow, along with that which proceeds to the main shank frame hydraulic cylinder 628, then proceeds to 50/50 hydraulic flow divider and combiner 624 by way of second spring biased vent to open directional blocking valve 618 in parallel with second check valve 646 and by way of first solenoid operated normally closed two way poppet valve 620. The second spring biased vent to open directional blocking valve 618 is piloted by hydraulic pressure taken from the tillage implement hydraulic system 600 immediately after first check valve 610 by way of a hydraulic flow restrictor 618A. Hydraulic pressure piloting the second spring biased vent to open directional blocking valve 618 is limited by a second hydraulic pressure control valve 616. While the hydraulic flow divider and combiner 624 divides the flow in a 50/50 ratio in the embodiment illustrated, other ratios are contemplated.

Hydraulic flow and pressure proceeding from the hydraulic flow divider and combiner 624, having been divided between hydraulic flow and pressure going to the right wing front shank frame hydraulic subsystem 602 and right wing rear auxiliary implement hydraulic subsystem 606, and that going to the left wing front shank frame hydraulic subsystem 604 and left wing rear auxiliary implement hydraulic subsystem 608, then passes through right wing front shank frame hydraulic flow restrictors 630A, 630B, 630C, and right wing rear auxiliary implement hydraulic flow restrictors 634A, 634B, 634C, and through left wing front shank frame hydraulic flow restrictors 632A, 632B, 632C, and left wing rear auxiliary implement hydraulic flow restrictors 636A, 636B, 636C, respectively. The hydraulic flow and pressure is then admitted into right wing front shank frame hydraulic cylinders 638A, 638B, 638C, and right wing rear auxiliary implement hydraulic cylinders 642A, 642B, 642C, and into left wing front shank frame hydraulic cylinders 640A, 640B, 640C, and left wing rear auxiliary implement hydraulic cylinders 644A, 644B, 644C, respectively.

Right wing front shank frame hydraulic cylinders 638A, 638B, and 638C, and left wing front shank frame hydraulic cylinders 640A, 640B, and 640C are functionally equivalent to the hydraulic cylinders 68 shown in FIGS. 1 through 7. Right wing rear auxiliary implement hydraulic cylinders 642A, 642B, and 642C, and left wing rear auxiliary implement hydraulic cylinders 644A, 644B, and 644C are functionally equivalent to the hydraulic cylinders 90 shown in FIGS. 1 through 7.

Note that for illustration purposes, the main shank frame hydraulic cylinder 628 is shown acting in retraction, the wing front shank frame hydraulic cylinders 638A, 638B, 638C, 640A, 640B, 640C are shown acting in retraction, and the wing rear auxiliary implement hydraulic cylinders 642A, 642B, 642C, 644A, 644B, 644C are shown acting in extension. However, it is contemplated that any cylinder shown in the hydraulic diagram of FIG. 9 may be reversed in its direction of action, and still be within the scope of the present invention. The hydraulic flow and pressure then returns from the tillage implement hydraulic system 600 by way of manifold 652, second solenoid operated normally closed two way poppet valve 622, and fourth check valve 650.

By way of the hydraulic arrangement shown in FIG. 9, and by way of appropriate sizing of the hydraulic flow control valve 626 and the hydraulic flow restrictors 630A, 630B, 630C, 623A, 632B, 632C, 634A, 634B, 634C, 636A, 636B, and 636C, and by way of the appropriate arrangement of directional blocking valves 614 and 618 as shown, the tillage implement hydraulic system 600 functions to coordinate the motions of the main shank frame 28, the wing front shank frames 66A, 66B, 66C, 66D, 66E, and 66F, and the wing section rear auxiliary implements 78 as the agricultural tillage implement 10 transitions from the operating configuration to the transport configuration and vice versa.

Specifically, the tillage implement hydraulic system 600 may function to raise the main shank frame 28 in advance of raising the wing front shank frames 66A, 66B, 66C, 66D, 66E, and 66F, and raising the wing section rear auxiliary implements 78 when transitioning from the operating configuration to the transport configuration. The tillage implement hydraulic system 600 may function to lower the wing front shank frames 66A, 66B, 66C, 66D, 66E, and 66F, and lower the wing section rear auxiliary implements 78 in advance of lowering the main shank frame 28 when transitioning from the transport configuration to the operating configuration.

This is accomplished by way of the first spring biased vent to open directional blocking valve 614, hydraulic flow restrictor 614A, first hydraulic pressure control valve 612, and third check valve 648 acting as one logic element, and by way of the second spring biased vent to open directional blocking valve 618, hydraulic flow restrictor 618A, second hydraulic pressure control valve 616, and second check valve 646 acting as another logic element. Specifically, when transitioning from the operating configuration to the transport configuration, all hydraulic flow is directed to the main shank frame hydraulic cylinder 628 until the main shank frame hydraulic cylinder 628 reaches the end of its stroke. This raises the hydraulic pressure piloting the second spring biased vent to open directional blocking valve 618, which then opens to allow hydraulic pressure and flow to the remainder of the hydraulic cylinders 638A, 638B, 638C, 640A, 640B, 640C, 642A, 642B, 642C, 644A, 644B, and 644C. When transitioning from the transport configuration to the operating configuration, the reverse occurs, such that all hydraulic flow is directed to the hydraulic cylinders 638A, 638B, 638C, 640A, 640B, 640C, 642A, 642B, 642C, 644A, 644B, and 644C until they reach the end of their strokes. This raises the hydraulic pressure piloting the first spring biased vent to open directional blocking valve 614, which then opens to allow hydraulic pressure and flow to the main shank frame hydraulic cylinder 628.

Figure 10:
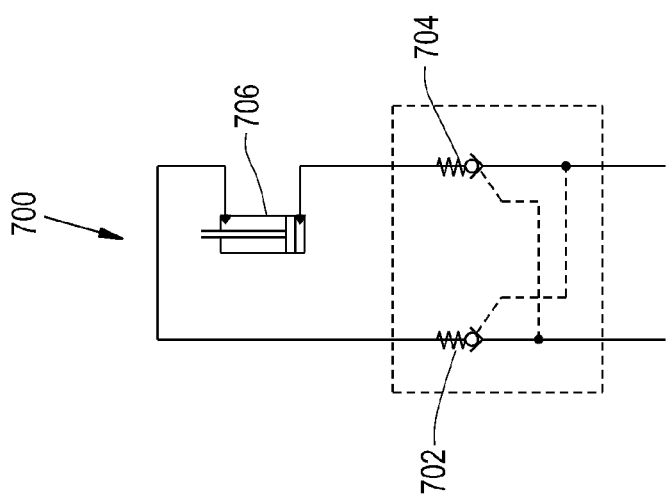
FIG. 10 is a schematic illustration of a tillage implement hydraulic system according to another embodiment of the present invention.

Turning now to FIG. 10, a schematic illustration of a hitch lock hydraulic system 700 according to an embodiment of the invention which may be used with either of the previous tillage implement hydraulic systems 600 or 900, is shown. Hydraulic pressure and flow is admitted to the hitch lock hydraulic system 700, whereupon the hydraulic pressure and flow passes through a first pilot to open check valve 702, and then proceeds to the hitch lock cylinder 706. Hydraulic flow then exists the hitch lock hydraulic system 700 by way of second pilot to open check valve 704. The first pilot to open check valve 702 receives pilot pressure from hydraulic pressure and flow exiting the hitch lock hydraulic system 700, and the second pilot to open check valve 704 receives pilot pressure from hydraulic pressure and flow entering the hitch lock hydraulic system 700. Although illustrated as separate pilot to open check valves 702, 704, a dual pilot to open check valve may be used. Hitch lock cylinder 706 is functionally equivalent to the hitch lock cylinder 126 shown in FIGS. 1 through 7.

Figure 11:
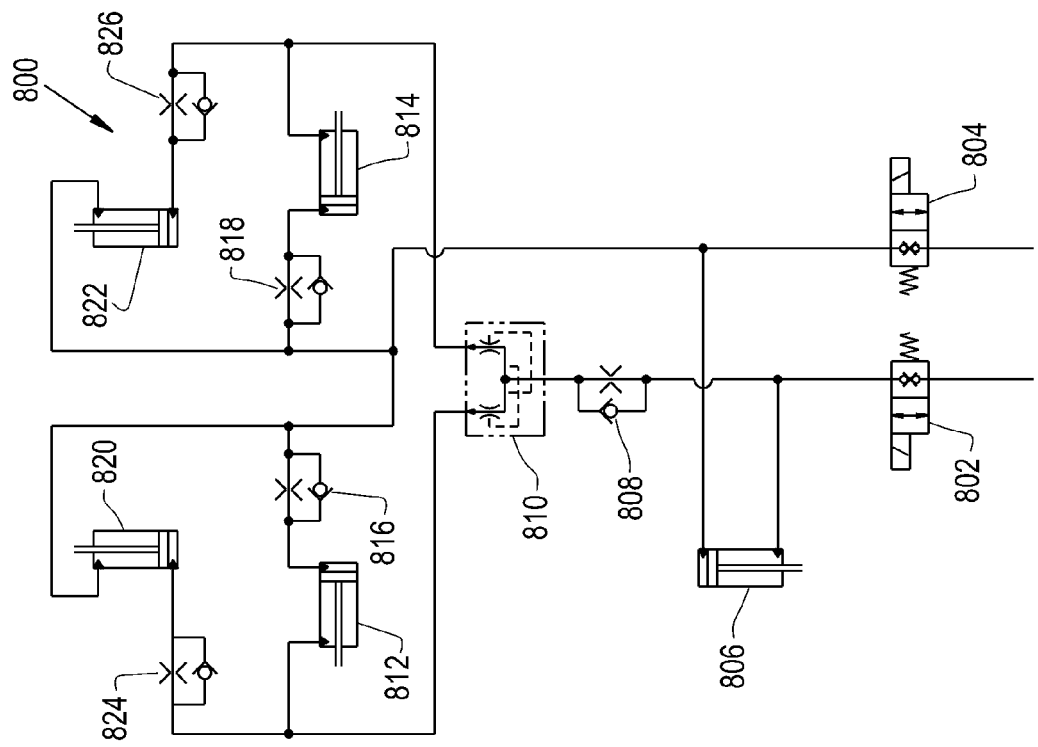
FIG. 11 is a schematic illustration of a tillage implement hydraulic system according to another embodiment of the present invention.

Turning now to FIG. 11, a schematic illustration of a main fold, pivoting swing arm, and pull hitch hydraulic system 800 according to an embodiment of the invention which may be used with either of the previous tillage implement hydraulic systems 600 or 900, is shown. Hydraulic pressure and flow is admitted to the main fold, pivoting swing arm, and pull hitch hydraulic system 800, whereupon the hydraulic pressure and flow passes through a first solenoid operated normally closed two way poppet valve 802. Part of the hydraulic pressure and flow then proceeds to the pull hitch hydraulic cylinder 806. Hydraulic flow from the pull hitch hydraulic cylinder 806 then exits the main fold, pivoting swing arm, and pull hitch hydraulic system 800 by way of a second solenoid operated normally closed two way poppet valve 804.

Another part of the hydraulic pressure and flow proceeds to a 50/50 wing fold hydraulic flow divider and combiner 810 by way of a first hydraulic flow control valve 808. While the hydraulic flow divider and combiner 808 divides the flow in a 50/50 ratio in the embodiment illustrated, other ratios are contemplated. One divided part of the hydraulic flow and pressure proceeding from the hydraulic flow divider and combiner 808 is then admitted into right pivoting swing arm hydraulic cylinder 812 and, in parallel, into right main fold hydraulic cylinder 820 by way of right main fold hydraulic flow control valve 824. The other divided part of the hydraulic flow and pressure proceeding from the hydraulic flow divider and combiner 808 is then admitted into left pivoting swing arm hydraulic cylinder 814 and, in parallel, into left main fold hydraulic cylinder 822 by way of left main fold hydraulic flow control valve 826. Hydraulic flow proceeding from right pivoting swing arm hydraulic cylinder 812 by way of right pivoting swing arm hydraulic flow control valve 816, from left pivoting swing arm hydraulic cylinder 814 by way of left pivoting swing arm hydraulic flow control valve 818, from right main fold hydraulic cylinder 820, and from left main fold hydraulic cylinder 822, then recombines and exits the main fold, pivoting swing arm, and pull hitch hydraulic system 800 by way of the second solenoid operated normally closed two way poppet valve 804.

Pull hitch hydraulic cylinder 806, right pivoting swing arm hydraulic cylinder 812, left pivoting swing arm hydraulic cylinder 814, left main fold hydraulic cylinder 822, and right main fold hydraulic cylinder 820 are functionally equivalent to pull hitch hydraulic cylinder 55, right and left pivoting swing arm hydraulic cylinders 110, left main fold hydraulic cylinder 116A, and right main fold hydraulic cylinder 116B, respectively, shown in FIGS. 1 through 7.

The hitch lock hydraulic system 700 and main fold, pivoting swing arm, and pull hitch hydraulic system 800, in combination with tillage implement hydraulic system 600 or 900, functions to coordinate the motions of the telescoping hitch lock cylinder 126, the pull hitch 124, the draft linkage assemblies 200, the forward folding wing sections 14A, 14B, 16A, 16B, 18A, and 18B, the main shank frame 28, the wing front shank frames 66A, 66B, 66C, 66D, 66E, and 66F, and the wing section rear auxiliary implements 78 as the agricultural tillage implement 10 transitions from the operating configuration to the transport configuration and vice versa. Hydraulic flow control valves 808, 816, 818, 824, and 826 cooperate to allow the hitch lock cylinder 706 to unlock the telescoping pull hitch tube 20 prior to the left and right pivoting swing arm hydraulic cylinders 814 and 812 retracting and causing the pivoting swing arms 98 to rotate inwards, and prior to the left and right main fold hydraulic cylinders 822 and 820 extending and causing the wing sections 14A, 14B, 16A, 16B, 18A, and 18B to fold forward. This is accomplished by way of the hydraulic arrangements shown in FIGS. 10 and 11, in combination with either of the hydraulic arrangements shown in FIG. 8 or 9, and by way of appropriate sizing of the hydraulic flow control valves 808, 816, 818, 824, and 826, in combination with appropriate sizing of the hydraulic flow control valves 914, 916, 930A, 930B, 930C, 932A, 932B, 932C, 934A, 934B, 934C, 936A, 936B, and 936C of tillage implement hydraulic system 900, or in combination with appropriate sizing of the hydraulic flow control valve 626 and the hydraulic flow restrictors 630A, 630B, 630C, 623A, 632B, 632C, 634A, 634B, 634C, 636A, 636B, and 636C, and appropriate arrangement of directional blocking valves 614 and 618, as shown, of tillage implement hydraulic system 600.

Specifically, the hitch lock hydraulic system 700 and main fold, pivoting swing arm, and pull hitch hydraulic system 800, in combination with tillage implement hydraulic system 600 or 900, may function to reconfigure the agricultural tillage implement 10 from the operating configuration to the transport configuration by sequentially pivoting the main shank frame 28 up and over the tool bar 24 by retracting hydraulic cylinder 58, pivoting the wing front shank frames 66A, 66B, 66C, 66D, 66E, and 66F to a generally vertical position by retracting hydraulic cylinders 68, pivoting the wing section rear auxiliary implements 78 to a generally vertical position by extending hydraulic cylinders 90, retracting telescoping hitch lock cylinder 126, folding diagonally angled draft tubes 72 inward using pivoting swing arm hydraulic cylinders 110 and pivoting swing arms 98 of draft linkage assembly 200, and pivoting the wing sections 14A, 14B, 16A, 16B, 18A, and 18B about generally vertical axes 86 and 88 to a position adjacent to and generally parallel with the pull hitch tube 20 using main fold hydraulic cylinders 116.

The hitch lock hydraulic system 700 and main fold, pivoting swing arm, and pull hitch hydraulic system 800, in combination with tillage implement hydraulic system 600 or 900, may function to reconfigure the agricultural tillage implement 10 from the transport configuration to the operating configuration by pivoting the wing sections 14A, 14B, 16A, 16B, 18A, and 18B outward about generally vertical axes 86 and 88 to the position perpendicular to the pull hitch tube 20 using main fold hydraulic cylinders 116, folding diagonally angled draft tubes 72 outward using pivoting swing arm hydraulic cylinders 110 and pivoting swing arms 98 of draft linkage assembly 200, extending the telescoping hitch lock hydraulic cylinder 126, unlocking and pivoting the wing front shank frames 66A, 66B, 66C, 66D, 66E, and 66F to the generally horizontal position by extending hydraulic cylinders 68, unlocking and pivoting the wing section rear auxiliary implements 78 to the generally horizontal position by retracting hydraulic cylinders 90, and pivoting the main shank frame 28 down and forward of the tool bar 24 by extending hydraulic cylinder 58.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
a main frame section including a telescoping pull hitch tube extending in a travel direction, and a tool bar attached to and extending transverse to said telescoping pull hitch tube;
a left wing section and a right wing section pivotally coupled with said main frame section, operable to pivot forward to positions adjacent to and generally parallel with said pull hitch tube when in a transport configuration, and operable to pivot outward to positions perpendicular to said pull hitch tube when in an operating configuration;
at least one left wing implement pivotally coupled with said left wing section and at least one right wing implement pivotally coupled with said right wing section, said wing implements operable to pivot to generally vertical positions when in said transport configuration and operable to pivot to generally horizontal positions when in said operating configuration; and
a hydraulic system having at least one left hydraulic circuit supplying hydraulic pressure and flow to at least one left wing hydraulic subsystem for actuating said at least one left wing implement, and at least one right hydraulic circuit supplying hydraulic pressure and flow to at least one right wing hydraulic subsystem for actuating said at least one right wing implement,
wherein said hydraulic system has at least one hydraulic flow divider and combiner dividing hydraulic flow and pressure between said at least one left hydraulic circuit and said at least one right hydraulic circuit, said at least one hydraulic flow divider and combiner functioning to coordinate the motion of said at least one left wing implement and said at least one right wing implement,
wherein each said left wing implement is actuated by a left wing implement hydraulic cylinder hydraulically connected to said at least one left wing hydraulic subsystem by way of at least one hydraulic flow control valve,
wherein each said right wing implement is actuated by a right wing implement hydraulic cylinder hydraulically connected to said at least one right wing hydraulic subsystem by way of at least one hydraulic flow control valve, and
wherein each said hydraulic flow control valve is oriented to provide unrestricted hydraulic flow through a check valve when said hydraulic system is being used to pivot said at least one left wing implement and said at least one right wing implement to said vertical positions, and to provide restricted hydraulic flow through a restrictor when said hydraulic system is being used to pivot said at least one left wing implement and said at least one right wing implement to said horizontal positions.

2. The agricultural tillage implement of claim 1, wherein:
said at least one left wing implement further comprises at least one left wing front implement and at least one left wing rear implement;
said at least one right wing implement further comprises at least one right wing front implement and at least one right wing rear implement;
said at least one left hydraulic circuit supplying said at least one left wing hydraulic subsystem further comprises at least one left front hydraulic circuit supplying at least one left wing front hydraulic subsystem for actuating said at least one left wing front implement and at least one left rear hydraulic circuit supplying at least one left wing rear hydraulic subsystem for actuating said at least one left wing rear implement; and
said at least one right hydraulic circuit supplying said at least one right wing hydraulic subsystem further comprises at least one right front hydraulic circuit supplying at least one right wing front hydraulic subsystem for actuating said at least one right wing front implement and at least one right rear hydraulic circuit supplying at least one right wing rear hydraulic subsystem for actuating said at least one right wing rear implement.

3. The agricultural tillage implement of claim 1, wherein:
each said left wing implement being actuated by a left wing implement hydraulic cylinder hydraulically connected to said at least one left wing hydraulic subsystem by way of at least one hydraulic flow restrictor; and
each said right wing implement being actuated by a right wing implement hydraulic cylinder hydraulically connected to said at least one right wing hydraulic subsystem by way of at least one hydraulic flow restrictor.

4. The agricultural tillage implement of claim 1, further comprising:
a main shank frame pivotally coupled with said tool bar and actuated by a main shank frame hydraulic cylinder connected to said hydraulic system, said main shank frame operable to pivot up and over said tool bar when in said transport configuration and operable to pivot down and forward of said tool bar when in said operating configuration.

5. The agricultural tillage implement of claim 4, wherein:
said main shank frame hydraulic cylinder receiving hydraulic flow and pressure from said hydraulic system by way of a hydraulic flow control valve, and exhausting hydraulic flow and pressure to said hydraulic system by way of a first spring biased vent to open directional blocking valve in parallel with a first check valve when transitioning from said operating configuration to said transport configuration;
said main shank frame hydraulic cylinder receiving hydraulic flow and pressure from said hydraulic system by way of said first spring biased vent to open directional blocking valve in parallel with said first check valve, and exhausting hydraulic flow and pressure to said hydraulic system by way of said hydraulic flow control valve when transitioning from said transport configuration to said operating configuration;
said at least one hydraulic flow divider and combiner receiving hydraulic flow and pressure from said hydraulic system by way of a second spring biased vent to open directional blocking valve in parallel with a second check valve when transitioning from said operating configuration to said transport configuration, and exhausting hydraulic flow and pressure to said hydraulic system by way of said second spring biased vent to open directional blocking valve in parallel with said second check valve when transitioning from said transport configuration to said operating configuration; and
said hydraulic flow control valve, said first spring biased vent to open directional blocking valve, said first check valve, said second spring biased vent to open directional blocking valve and said second check valve functioning in conjunction with said at least one left wing hydraulic subsystem and said at least one right hydraulic subsystem to cause said main shank frame to pivot up and over said tool bar prior to said at least one left wing implement and said at least one right wing implement pivoting to said generally vertical positions when transitioning from said operating configuration to said transport configuration, and to cause said at least one left wing implement and said at least one right wing implement to pivot to said generally horizontal positions prior to said main shank frame pivoting down and forward of said tool bar when transitioning from said transport configuration to said operating configuration.

6. The agricultural tillage implement of claim 4, wherein:
said main shank frame hydraulic cylinder receiving hydraulic flow and pressure from said hydraulic system by way of a first solenoid operated normally closed two position one way valve and a first hydraulic flow control valve, and exhausting hydraulic flow and pressure to said hydraulic system by way of a second solenoid operated normally closed two position one way valve and a second hydraulic flow control valve; and
said first solenoid operated normally closed two position one way valve, said first hydraulic flow control valve, said second solenoid operated normally closed two position one way valve, and said second hydraulic flow control valve functioning in conjunction with said at least one left wing hydraulic subsystem and said at least one right hydraulic subsystem to cause said main shank frame to pivot up and over said tool bar prior to said at least one left wing implement and said at least one right wing implement pivoting to said generally vertical positions when transitioning from said operating configuration to said transport configuration, and to cause said at least one left wing implement and said at least one right wing implement to pivot to said generally horizontal positions prior to said main shank frame pivoting down and forward of said tool bar when transitioning from said transport configuration to said operating configuration.

7. The agricultural tillage implement of claim 1, further comprising:
a left pivoting swing arm connected to said left wing section and to a left diagonal draft tube, said left diagonal draft tube being further connected to said telescoping pull hitch, said left pivoting swing arm being actuated by a left pivoting swing arm hydraulic cylinder;
a right pivoting swing arm connected to said right wing section and to a right diagonal draft tube, said right diagonal draft tube being further connected to said telescoping pull hitch, said right pivoting swing arm being actuated by a right pivoting swing arm hydraulic cylinder;
said left wing section being actuated by a left main fold hydraulic cylinder;
said right wing section being actuated by a right main fold hydraulic cylinder;
said left pivoting swing arm hydraulic cylinder, said right pivoting swing arm hydraulic cylinder, said left main fold hydraulic cylinder, and said right main fold hydraulic cylinder receiving hydraulic flow and pressure from said hydraulic system by way of a first solenoid operated normally closed two way poppet valve, a first hydraulic flow control valve, and a wing fold hydraulic flow divider and combiner dividing hydraulic flow and pressure between a left wing fold hydraulic circuit supplying said left pivoting swing arm hydraulic cylinder and said left main fold hydraulic cylinder and a right wing fold hydraulic circuit supplying said right pivoting swing arm hydraulic cylinder and said right main fold hydraulic cylinder;
said left pivoting swing arm hydraulic cylinder and said left main fold hydraulic cylinder being hydraulically connected to said left wing fold hydraulic circuit in parallel, so that said left pivoting swing arm hydraulic cylinder is in line with and precedes a left pivoting swing arm hydraulic flow control valve, and so that said left main fold hydraulic cylinder is in line with and follows a left main fold hydraulic flow control valve, said left pivoting swing arm hydraulic flow control valve and said left main fold hydraulic flow control valve functioning to cause said left pivoting swing arm to pivot inward prior to said left wing section pivoting forward when transitioning from said operating configuration to said transport configuration, and to cause said left wing section to pivot outward prior to said left pivoting swing arm pivoting outward when transitioning from said transport configuration to said operating configuration; and said right pivoting swing arm hydraulic cylinder and said right main fold hydraulic cylinder being hydraulically connected to said right wing fold hydraulic circuit in parallel, so that said right pivoting swing arm hydraulic cylinder is in line with and precedes a right pivoting swing arm hydraulic flow control valve, and so that said right main fold hydraulic cylinder is in line with and follows a right main fold hydraulic flow control valve, said right pivoting swing arm hydraulic flow control valve and said right main fold hydraulic flow control valve functioning to cause said right pivoting swing arm to pivot inward prior to said right wing section pivoting forward when transitioning from said operating configuration to said transport configuration, and to cause said right wing section to pivot outward prior to said right pivoting swing arm pivoting outward when transitioning from said transport configuration to said operating configuration.

8. A hydraulic system for an agricultural tillage implement having a main frame section including a telescoping pull hitch tube extending in a travel direction, a tool bar attached to and extending transverse to the telescoping pull hitch tube, a left wing section and a right wing section pivotally coupled with the main frame section, operable to pivot forward to positions adjacent to and generally parallel with the pull hitch tube when in a transport configuration, and operable to pivot outward to positions perpendicular to the pull hitch tube when in an operating configuration, at least one left wing implement pivotally coupled with the left wing section and at least one right wing implement pivotally coupled with the right wing section, the wing implements operable to pivot to generally vertical positions when in the transport configuration and operable to pivot to generally horizontal positions when in the operating configuration, and a main shank frame pivotally coupled with the tool bar, operable to pivot up and over the tool bar when in the transport configuration, and operable to pivot down and forward of the tool bar when in the operating configuration, comprising:

at least one left hydraulic circuit supplying hydraulic pressure and flow to at least one left wing hydraulic subsystem for actuating the at least one left wing implement, and at least one right hydraulic circuit supplying hydraulic pressure and flow to at least one right wing hydraulic subsystem for actuating the at least one right wing implement; and at least one hydraulic flow divider and combiner dividing hydraulic flow and pressure between said at least one left hydraulic circuit and said at least one right hydraulic circuit, said at least one hydraulic flow divider and combiner functioning to coordinate the motion of the at least one left wing implement and the at least one right wing implement, wherein each left wing implement is actuated by a left wing implement hydraulic cylinder hydraulically connected to said at least one left wing hydraulic subsystem by way of at least one hydraulic flow control valve, wherein each right wing implement is actuated by a right wing implement hydraulic cylinder hydraulically connected to said at least one right wing hydraulic subsystem by way of at least one hydraulic flow control valve, and wherein each said hydraulic flow control valve is oriented to provide unrestricted hydraulic flow through a check valve when said hydraulic system is being used to pivot said at least one left wing implement and said at least one right wing implement to said vertical positions, and to provide restricted hydraulic flow through a restrictor when said hydraulic system is being used to pivot said at least one left wing implement and said at least one right wing implement to said horizontal positions.

9. The hydraulic system of claim 8, wherein:

the at least one left wing implement further comprises at least one left wing front implement and at least one left wing rear implement;

the at least one right wing implement further comprises at least one right wing front implement and at least one right wing rear implement;

said at least one left hydraulic circuit supplying said at least one left wing hydraulic subsystem further comprises at least one left front hydraulic circuit supplying at least one left wing front hydraulic subsystem for actuating the at least one left wing front implement and at least one left rear hydraulic circuit supplying at least one left wing rear hydraulic subsystem for actuating the at least one left wing rear implement; and said at least one right hydraulic circuit supplying said at least one right wing hydraulic subsystem further comprises at least one right front hydraulic circuit supplying at least one right wing front hydraulic subsystem for actuating the at least one right wing front implement and at least one right rear hydraulic circuit supplying at least one right wing rear hydraulic subsystem for actuating the at least one right wing rear implement.

10. The hydraulic system of claim 8, wherein:

each left wing implement being actuated by a left wing implement hydraulic cylinder hydraulically connected to said at least one left wing hydraulic subsystem by way of at least one hydraulic flow restrictor; and each right wing implement being actuated by a right wing implement hydraulic cylinder hydraulically connected to said at least one right wing hydraulic subsystem by way of at least one hydraulic flow restrictor.

11. The hydraulic system of claim 8, further comprising:

a main shank frame hydraulic cylinder actuating the main shank frame and receiving hydraulic flow and pressure from said hydraulic system by way of a hydraulic flow control valve, and exhausting hydraulic flow and pressure by way of a first spring biased vent to open directional blocking valve in parallel with a first check valve when transitioning from said operating configuration to said transport configuration;

said main shank frame hydraulic cylinder receiving hydraulic flow and pressure from said hydraulic system by way of said first spring biased vent to open directional blocking valve in parallel with said first check valve, and exhausting hydraulic flow and pressure to said hydraulic system by way of said hydraulic flow control valve when transitioning from said transport configuration to said operating configuration;

said at least one hydraulic flow divider and combiner receiving hydraulic flow and pressure by way of a second spring biased vent to open directional blocking valve in parallel with a second check valve when transitioning from said operating configuration to said transport configuration, and exhausting hydraulic flow and pressure to said hydraulic system by way of said second spring biased vent to open directional blocking valve in parallel with said second check valve when transitioning from said transport configuration to said operating configuration; and said hydraulic flow control valve, said first spring biased vent to open directional blocking valve, said first check valve, said second spring biased vent to open directional blocking valve and said second check valve functioning in conjunction with said at least one left wing hydraulic subsystem and said at least one right hydraulic subsystem to cause the main shank frame to pivot up and over the tool bar prior to the at least one left wing implement and the at least one right wing implement pivoting to their generally vertical positions when transitioning from the operating configuration to the transport configuration, and to cause the at least one left wing implement and the at least one right wing implement to pivot to the generally horizontal positions prior to the main shank frame pivoting down and forward of the tool bar when transitioning from the transport configuration to the operating configuration.

12. The hydraulic system of claim 8, further comprising:

a main shank frame hydraulic cylinder actuating the main shank frame, receiving hydraulic flow and pressure from said hydraulic system by way of a first solenoid operated normally closed two position one way valve and a first hydraulic flow control valve, and exhausting hydraulic flow and pressure to said hydraulic system by way of a second solenoid operated normally closed two position one way valve and a second hydraulic flow control valve; and said first solenoid operated normally closed two position one way valve, said first hydraulic flow control valve, said second solenoid operated normally closed two position one way valve, and said second hydraulic flow control valve functioning in conjunction with said at least one left wing hydraulic subsystem and said at least one right wing hydraulic subsystem to cause said main shank frame to pivot up and over said tool bar prior to said at least one left wing implement and said at least one right wing implement pivoting to said generally vertical positions when transitioning from said operating configuration to said transport configuration, and to cause said at least one left wing implement and said at least one right wing implement to pivot to said generally horizontal positions prior to said main shank frame pivoting down and forward of said tool bar when transitioning from said transport configuration to said operating configuration.

\* \* \* \* \*